US011018882B2

(12) United States Patent
Wang et al.

(10) Patent No.: US 11,018,882 B2
(45) Date of Patent: May 25, 2021

(54) SESSION FILTERING METHOD AND DEVICE

(71) Applicant: Alibaba Group Holding Limited, Grand Cayman (KY)

(72) Inventors: Chaopi Wang, Zhejiang (CN); Feng Bao, Zhejiang (CN)

(73) Assignee: Alibaba Group Holding Limited

( * ) Notice: Subject to any disclaimer, the term of this patent is extended or adjusted under 35 U.S.C. 154(b) by 0 days.

(21) Appl. No.: 16/570,620

(22) Filed: Sep. 13, 2019

(65) Prior Publication Data

US 2020/0007353 A1 Jan. 2, 2020

Related U.S. Application Data

(63) Continuation of application No. PCT/CN2018/077883, filed on Mar. 2, 2018.

(30) Foreign Application Priority Data

Mar. 15, 2017 (CN) .......................... 201710153887.1

(51) Int. Cl.
*H04L 12/00* (2006.01)
*H04L 12/18* (2006.01)
(Continued)

(52) U.S. Cl.
CPC ...... *H04L 12/1822* (2013.01); *G06F 16/9535* (2019.01); *H04L 12/1831* (2013.01);
(Continued)

(58) Field of Classification Search
CPC ..... H04L 12/1831; H04L 67/22; H04L 67/14; H04L 67/24; H04L 12/1822;
(Continued)

(56) References Cited

U.S. PATENT DOCUMENTS 6,856,995 B1* 2/2005 Ibitayo ................ H04L 67/02
717/116
7,000,019 B2* 2/2006 Low ..................... G06Q 20/40
455/2.01
(Continued)

FOREIGN PATENT DOCUMENTS

CN 101094195 A 12/2007
CN 101106536 A 1/2008
(Continued)

OTHER PUBLICATIONS

Chinese Office Action dated Jun. 28, 2020, for Chinese Patent Application No. 201710153887.1, a counterpart foreign application of U.S. Appl. No. 16/570,620, 7 pages.
(Continued)

*Primary Examiner* — Frantz Coby
(74) *Attorney, Agent, or Firm* — Lee & Hayes, P.C.

(57) ABSTRACT

A session filtering method including displaying session page entries corresponding to at least a part of communication sessions in which a user at a local end participates via a preset communication application, presentation areas of the session page entries containing filterable labels associated with corresponding communication sessions; when a filterable label is triggered, filtering one or more communication sessions associated with the filterable label from communication sessions corresponding to the displayed session page entries; and presenting one or more session page entries corresponding to the filtered communication sessions to the user at the local end. Through the technical solution of the present disclosure, a communication session is quickly filtered and found, which is conducive to improve communication efficiency.

18 Claims, 22 Drawing Sheets

(51) Int. Cl.
  *G06F 16/9535* (2019.01)
  *H04L 29/08* (2006.01)
(52) U.S. Cl.
  CPC .............. *H04L 67/14* (2013.01); *H04L 67/22* (2013.01); *H04L 67/24* (2013.01); *H04L 67/306* (2013.01)
(58) Field of Classification Search
  CPC ... H04L 67/306; H04L 29/08; G06F 16/9035; G06F 16/9535
  USPC .................................................. 709/227, 238
  See application file for complete search history.

(56) References Cited

U.S. PATENT DOCUMENTS

| | | | | |
|---|---|---|---|---|
| 7,058,164 | B1* | 6/2006 | Chan | H04M 3/20 379/265.09 |
| 7,720,910 | B2* | 5/2010 | Goodman | G06Q 10/107 709/206 |
| 7,747,632 | B2 | 6/2010 | Korn et al. | |
| 7,894,837 | B2* | 2/2011 | Heredia | H04L 51/04 455/466 |
| 8,289,965 | B2* | 10/2012 | Bugenhagen | H04L 67/141 370/392 |
| 8,839,456 | B2* | 9/2014 | Ting | H04L 63/102 726/28 |
| 9,209,983 | B2* | 12/2015 | Batz | G06Q 30/04 |
| 9,264,452 | B2* | 2/2016 | Kim | H04N 7/173 |
| 9,525,777 | B2* | 12/2016 | Diana | H04M 3/5191 |
| 9,805,094 | B2* | 10/2017 | Miller | G06F 16/24568 |
| 2003/0028451 | A1 | 2/2003 | Ananian | |
| 2005/0249153 | A1* | 11/2005 | Park | H04W 24/00 370/328 |
| 2006/0173985 | A1 | 8/2006 | Moore | |
| 2007/0248220 | A1 | 10/2007 | Crandell et al. | |
| 2008/0263103 | A1 | 10/2008 | McGregor et al. | |
| 2009/0150562 | A1* | 6/2009 | Kim | H04L 65/1089 709/238 |
| 2010/0246571 | A1* | 9/2010 | Geppert | G06F 3/0486 370/352 |
| 2010/0246800 | A1* | 9/2010 | Geppert | H04L 65/403 379/265.09 |
| 2011/0288962 | A1 | 11/2011 | Rankin, Jr. et al. | |
| 2011/0289009 | A1 | 11/2011 | Rankin, Jr. et al. | |
| 2011/0289010 | A1 | 11/2011 | Rankin, Jr. et al. | |
| 2011/0289161 | A1 | 11/2011 | Rankin, Jr. et al. | |
| 2012/0271957 | A1 | 10/2012 | Carney et al. | |
| 2013/0204947 | A1* | 8/2013 | Guzman Suarez | G06F 16/90344 709/206 |
| 2014/0012678 | A1* | 1/2014 | Hayes, Jr. | G06Q 30/0276 705/14.64 |
| 2014/0135052 | A1* | 5/2014 | Apfel | G06F 3/0486 455/519 |
| 2014/0188662 | A1* | 7/2014 | Klein | G06Q 30/0613 705/26.41 |
| 2015/0074551 | A1* | 3/2015 | O'Sullivan | H04L 65/1069 715/753 |
| 2015/0229592 | A1* | 8/2015 | Rathod | G06F 3/0482 709/206 |
| 2015/0264173 | A1* | 9/2015 | Diana | H04M 3/5191 379/93.02 |
| 2016/0140168 | A1 | 5/2016 | Rankin, Jr. et al. | |
| 2016/0366200 | A1* | 12/2016 | Healy | H04L 67/10 |
| 2017/0125021 | A1* | 5/2017 | Garre | G10L 19/002 |

FOREIGN PATENT DOCUMENTS

| | | |
|---|---|---|
| CN | 101194277 | 6/2008 |
| CN | 101431486 A | 5/2009 |
| CN | 101483620 A | 7/2009 |
| CN | 102546454 A | 7/2012 |
| CN | 102571862 A | 7/2012 |
| CN | 102646134 A | 8/2012 |
| CN | 105207899 A | 12/2015 |
| CN | 105681173 A | 6/2016 |

OTHER PUBLICATIONS

Chinese Search Report dated Jun. 18, 2020 for Chinese Patent Application No. 201710153887.1, 2 pages.
Chinese Office Action dated Feb. 4, 2021, for Chinese Patent Application No. 201710153887.1, a counterpart foreign application of U.S. Appl. No. 16/570,620, 8 pages.
Chinese Search Report dated Jan. 29, 2021, for Chinese Patent Application No. 201710153887.1, a counterpart foreign application of U.S. Appl. No. 16/570,620, 1 page.

* cited by examiner

DISPLAY SESSION PAGE ENTRIES CORRESPONDING TO AT LEAST PART OF COMMUNICATION SESSIONS IN WHICH USER AT LOCAL END PARTICIPATES IN MOBILE ENTERPRISE OFFICE PLATFORM, PRESENTATION AREAS OF SESSION PAGE ENTRIES CONTAINING FILTERABLE LABELS ASSOCIATED WITH CORRESPONDING COMMUNICATION SESSIONS
202

WHEN ANY FILTERABLE LABEL IS TRIGGERED, FILTER COMMUNICATION SESSIONS ASSOCIATED WITH FILTERABLE LABEL FROM COMMUNICATION SESSIONS CORRESPONDING TO DISPLAYED SESSION PAGE ENTRIES
204

PRESENT SESSION PAGE ENTRIES CORRESPONDING TO FILTERED COMMUNICATION SESSIONS TO USER AT LOCAL END
206

| | | |
|---|---|---|
| COOPERATION | COOPERATION 1421 LABEL SORTING 5 1422 M: THIS VERSION ... 1423 | 10:45 |
| | 1402 | |
| (person icon) | XIAOBAI EVERYTHING IS READY (COLLEAGUE) | 10:45 |
| A B / C D | HARD-WORKING GROUP A: THE MEETING THIS AFTERNOON ... (ALL STAFF) | 10:38 |
| XIAOBEI | XIAOBAI HOW'S IT GOING? (EXTERNAL) | 23:50 YESTERDAY |
| D E / F G | PROJECT X F: TEST RESULT IS ... (INTERNAL) | 09:15 YESTERDAY |
| D E / M N | COOPERATIVE DEVELOPMENT M: THIS VERSION ... 1401 (COOPERATION 1411) | 09:10 YESTERDAY |
| ⋮ | | |
| A E / C N | AA&BB E: THANK YOU, EVERYBODY! (COOPERATION) | 09:10 FEBRUARY 1 |
| ⋮ | | |

FIG. 15

SESSION FILTERING METHOD AND DEVICE

CROSS REFERENCE TO RELATED PATENT APPLICATIONS

This application claims priority to and is a continuation of PCT Patent Application No. PCT/CN2018/077883, filed on 2 Mar. 2018 and entitled "SESSION FILTERING METHOD AND DEVICE," which claims priority to Chinese Patent Application No. 201710153887.1, filed on 15 Mar. 2017 and entitled "SESSION FILTERING METHOD AND DEVICE," which are incorporated herein by reference in their entirety.

TECHNICAL FIELD

The present disclosure relates to the field of terminal technologies, and, more particularly, to session filtering methods and session filtering devices.

BACKGROUND

In conventional techniques, mobile enterprise office platforms are more and more widely used in office processes of enterprises, educational institutions, government agencies and other teams. These platforms not only improve communication efficiency between users and reduce communication costs, but also effectively improve the event processing efficiency and office working efficiency of the users. For example, a mobile enterprise office platform may provide a communication function so that a user may communicate effectively with other users by creating a personal communication session or a group communication session.

However, in the long-term use of the mobile enterprise office platform, the user may create an increasing number of communication sessions, which makes it difficult for him/her to quickly find a communication session he/she wants, thus reducing the communication efficiency.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

In view of the foregoing, a session filtering method and a session filtering device are provided in the present disclosure, which quickly filter and find a communication session and are conducive to improve the communication efficiency.

In order to achieve the above objective, the present disclosure provides the following technical solutions.

According to an example embodiment of the present disclosure, a session filtering method is provided, including:
displaying session page entries corresponding to at least a part of communication sessions in which a user at a local end participates via a preset communication application, a respective presentation area of a respective session page entry including one or more filterable labels associated with a corresponding communication session;

when a filterable label is triggered, filtering one or more communication sessions associated with the filterable label from the communication sessions corresponding to the displayed session page entries; and
presenting one or more session page entries corresponding to the filtered one or more communication sessions to the user at the local end.

According to an example embodiment of the present disclosure, a session filtering method is provided, including:
determining, by a server of a preset communication application, a communication session in which a preset user participates;
determining, by the server, a filterable label matching the communication session according to a value of a particular parameter of the communication session; and
sending, by the server, a notification message to a client corresponding to the preset user, the notification message is used to notify the client of an association relationship between the communication session and the filterable label to instruct the client to display the filterable label in a presentation area of a session page entry corresponding to the communication session,
wherein the filterable label is used to instruct the client to, when the filterable label is triggered, filter the communication session associated with the filterable label to present the session page entry corresponding to the filtered communication session to the preset user.

According to an example embodiment of the present disclosure, a session filtering device is provided, including:
a first display unit configured to display session page entries corresponding to at least a part of communication sessions in which a user at the local end participates via a preset communication application, a respective presentation area of a respective session page entry including one or more filterable labels associated with a corresponding communication session;
a filtering unit configured to, when a filterable label is triggered, filter one or more communication sessions associated with the filterable label from the communication sessions corresponding to the displayed session page entries; and
a presentation unit configured to present one or more session page entries corresponding to the filtered one or more communication sessions to the user at the local end.

According to an example embodiment of the present disclosure, a session filtering device is provided, including:
a session determination unit configured to determine, by a server of a preset communication application, a communication session in which a preset user participates;
a label determination unit configured to determine, by the server, a filterable label matching the communication session according to a value of a particular parameter of the communication session; and
a sending unit configured to send, by the server, a notification message to a client corresponding to the preset user, the notification message being used to notify the client of an association relationship between the communication session and the filterable label to instruct the client to display the filterable label in a presentation area of a session page entry corresponding to the communication session,
wherein the filterable label is used to instruct the client to, when the filterable label is triggered, filter the communication session associated with the filterable label to present the session page entry corresponding to the filtered communication session to the preset user.

As shown from the above technical solutions, in the present disclosure, filterable labels are displayed in presentation areas of session page entries corresponding to communication sessions, so that a user only needs to record a filterable label associated with a communication session that the user intends to find, triggers any filterable label displayed, and performs a filtering operation based on the filterable label for the communication session. Therefore, the user conveniently and quickly finds the desired communication session and start a communication operation without flipping and checking all communication sessions, which is conducive to improve the communication efficiency.

BRIEF DESCRIPTION OF THE DRAWINGS

In order to illustrate the technical solutions in the example embodiments of the present disclosure more clearly, the following briefly describes the accompanying drawings which aid in describing the example embodiments. Apparently, the accompanying drawings in the following description merely show some of the example embodiments of the present disclosure, and persons of ordinary skill in the art may derive other drawings from these accompanying drawings without creative efforts.

FIG. 2 is a flowchart of a session filtering method based on a client according to an example embodiment of the present disclosure;

FIG. 15 is a schematic diagram of a session list page after filtering corresponding to FIG. 14;

DETAILED DESCRIPTION

Figure 1:
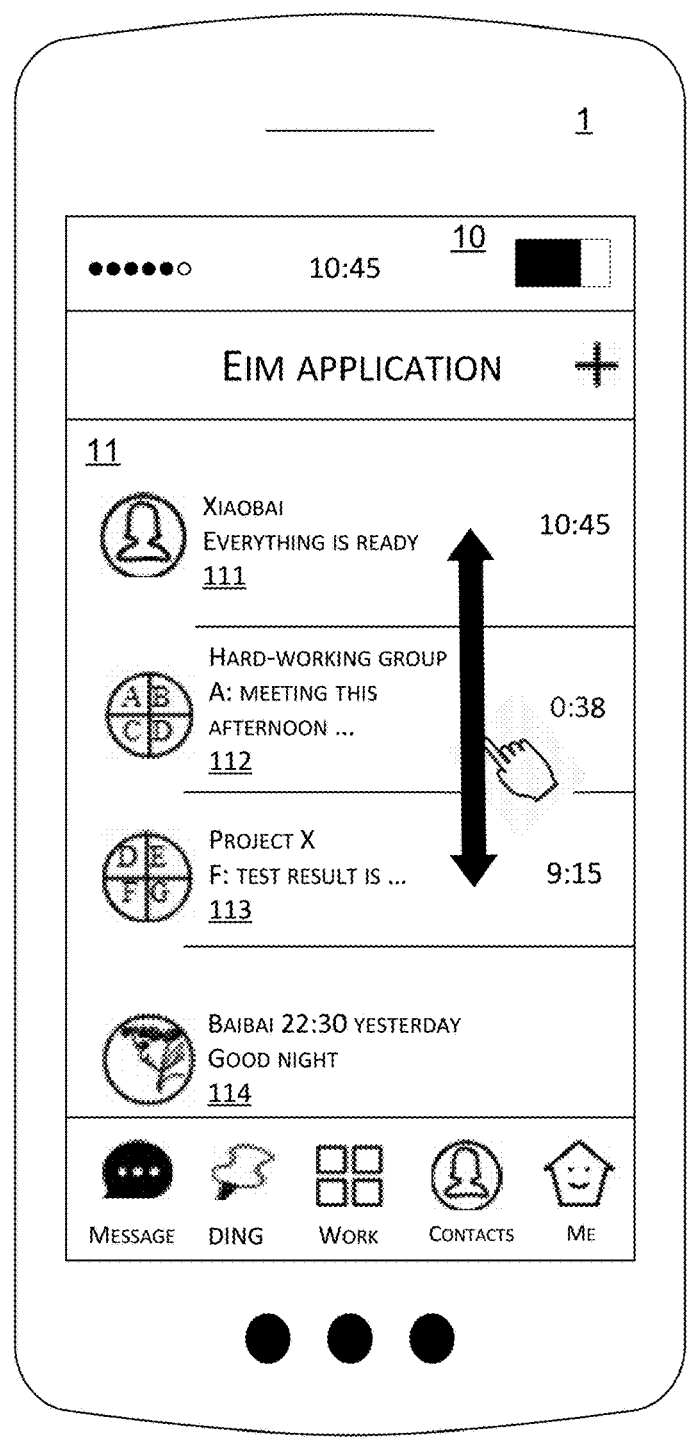
FIG. 1 is a schematic diagram of an electronic device displaying a session list page in the conventional techniques.

FIG. 1 is a schematic diagram of an electronic device displaying a session list page in the conventional techniques. As shown in FIG. 1, it is assumed that the electronic device is a mobile phone 1, the mobile phone 1 is provided with a screen 10 having a fixed size, and the screen 10 may be used to present a session list page 11 of a mobile enterprise office platform. The session list page 11 is configured to present session page entries corresponding to at least a part of communication sessions in which the user at the local end participates. As shown in FIG. 1, assuming that the user at the local end participates in a communication session with a user "Xiaobai" at a peer end, the session list page 11 may include a session page entry 111 of a corresponding communication session page. Similarly, the session list page 11 may further include session page entries corresponding to other communication sessions in which the user at the local end participates, for example, a session page entry 112 corresponding to a group "hard-working group", a session page entry 113 corresponding to a group "project X", a session page entry 114 corresponding to user "Baibai" at a peer end, and so on. When the user at the local end hopes to enter a communication session page corresponding to a certain communication session, the user at the local end may find a corresponding session page entry on the session list page 11, and enter the corresponding communication session page by triggering the session page entry.

However, as the user at the local end participates in an increasing number of communication sessions, the size of the session list page 11 (mainly the size of the length) becomes increasingly larger, and easily exceeds the display range of the screen 10 (for example, in FIG. 1, the lower part of the session page entry 114 cannot be fully displayed). At the same time, the session page entries on the session list page 11 are usually arranged in a reverse chronological order based on the latest communication moments (that is, the latest moments when communication messages were sent or received). For example, in FIG. 1, the latest communication moment of the session page entry 111 is "10:45", the latest communication moment of the session page entry 112 is "10:38", the latest communication moment of the session page entry 113 is "09:15", and the latest communication moment of the session page entry 114 is "22:30 yesterday", so that the session page entry 111, the session page entry 112, the session page entry 113 and the session page entry 114 are arranged in sequence from top to bottom. Therefore, especially for the communication session without operations of sending and receiving communication messages recently, the user at the local end needs to repeatedly flip and search on the session list page 11 to find the corresponding session page entry, resulting in extremely low communication efficiency.

Therefore, in the present disclosure, filterable labels associated with corresponding communication sessions are displayed in presentation areas corresponding to session page entries, so that the user at the local end only needs to know a filterable label associated with a communication session he/she is searching for, and trigger the same filterable label displayed in a presentation area of any session page entry to filter all communication session associated with the filterable label. Thus, the user at the local end only needs to perform a searching operation in session page entries corresponding to all the filtered communication sessions, which may greatly reduce the search range, thus solving the problem of the difficulty in finding a session page entry in the conventional techniques, and conducive to improve the communication efficiency.

In order to further describe the present disclosure, the following example embodiment is provided.

FIG. 2 is a flowchart of a session filtering method based on a client according to an example embodiment of the present disclosure. As shown in FIG. 2, the method may include the following steps.

In step 202, session page entries corresponding to at least a part of communication sessions in which a user at the local end participates via a preset communication application are displayed, presentation areas of the session page entries containing filterable labels associated with the corresponding communication sessions.

In this example embodiment, the mobile enterprise office platform may implement a communication function, such as an instant messaging function, a call function, a mailbox function, and so on. In addition, the mobile enterprise office platform also may be an integrated function platform of many other functions, such as processing on examination and approval events (such as asking for a leave, office supplies application, finance and other examination and approval events), attendance events, task events, log events and other enterprise internal events, as well as processing on meal ordering, purchasing and other enterprise external events, which is not limited in the present disclosure.

Specifically, the mobile enterprise office platform may be hosted in an instant messaging application in the conventional techniques such as an Enterprise Instant Messaging (EIM) application, and may be, for example, Skype For Business®, Microsoft Teams®, Yammer®, Workplace®, Slack®, enterprise WeChat®, Fxiaoke®, Enterprise Fetion®, Enterprise Easychat®, and so on. Of course, the instant messaging function is only one of the communication functions supported by the mobile enterprise office platform. The enterprise office platform may also implement more other functions like the above, which will not be described in detail here.

It should be noted that an application of a client of the mobile enterprise office platform may be installed in an electronic device in advance, so that the client may be started up and run on the electronic device. Of course, when an online "client" such as an HTML5 technology is adopted, the client may be acquired and run without installation of the corresponding application on the electronic device.

In this example embodiment, the filterable label may be constantly displayed in the presentation area of the corresponding session page entry; alternatively, the filterable label may remain hidden, and the filterable label is temporarily displayed in response to the trigger operation of the user at the local end. For example, when the user at the local end long-presses or hard-presses the presentation area of the session page entry, or hovers the cursor over the presentation area, it may be determined that the trigger operation is detected.

In this example embodiment, content of the filterable label may be related to at least one of the following information.

1) Consistency between team affiliation information of the user at the local end and a user at a peer end when the corresponding communication session is a personal communication session. For example, when the user at the local end and the user at the peer end belong to the same team (that is, their team affiliation information is consistent), the content of the filterable label may be "internal" or the like. When the user at the local end and the user at the peer end do not belong to the same team (that is, their team affiliation information is inconsistent), the content of the filterable label may be "external" or the like. Therefore, the user at the local end may conveniently and quickly filter communication sessions corresponding to "internal members of the team" or "external members outside the team" through the filterable label, thus narrowing the search range of the session page entry.

2) Team affiliation information of the user at the peer end when the corresponding communication session is a personal communication session. For example, the filterable label may be the name of the team to which the user at the peer end belongs, so that the user at the local end may quickly filter communication sessions under the corresponding team through the filterable label, thus narrowing the search range of the session page entry.

3) Type information of a corresponding group when the corresponding communication session is a group communication session, wherein the type information is related to consistency between team affiliation information of group members. For example, when the user at the local end and the group members belong to the same team (that is, the team affiliation information is consistent), it indicates that the corresponding group is an internal group of the team to which the user at the local end belongs, and the content of the filterable label may be "internal", "all staff", and the like. When the user at the local end and the group members do not belong to the same team (that is, the team affiliation information is inconsistent), it indicates that the corresponding group is a cross-enterprise group including the team to which the user at the local end belongs and another team, and the content of the filterable label may be "external", "cooperation", "cross-enterprise", and the like. Therefore, the user at the local end may conveniently and quickly filter communication sessions under the internal group or the cross-enterprise group through the filterable label, thus narrowing the search range of the session page entry.

4) Team affiliation information of the group members when the corresponding communication session is a group communication session. For example, the filterable label may be the name(s) of (one or more) team(s) to which all the group members belong. Therefore, the user at the local end may conveniently and quickly filter communication sessions under the corresponding team through the filterable label, thus narrowing the search range of the session page entry.

In fact, in addition to the above manners, the filterable label may be set and defined based on any predefined dimension, and different communication sessions may be classified or grouped in corresponding dimensions, so that the user at the local end may filter the corresponding communication sessions after triggering the filterable label, thus reducing the number of session page entries presented to the user at the local end, and narrowing the search range for the user at the local end. Therefore, the user at the local end may more quickly find the corresponding session page entry and conduct a corresponding communication behavior, thus improving the communication efficiency of the user at the local end.

In this example embodiment, the client of the mobile enterprise office platform may have the various filterable labels to be presented in distinguishable manners according to a predefined presentation attribute corresponding to each filterable label, so that the user at the local end may rapidly identify each filterable label according to the presentation attributes of the filterable labels in the process of flipping and viewing displayed session page entries even if he/she does not view content of the filterable labels, thus improving the efficiency of identifying and searching the filterable label by the user at the local end. The presentation attribute may include a label color of the filterable label, and of course may also include any other attribute such as size, shape, and transparency, or a combination of any attributes, which is not limited in the present disclosure.

In this example embodiment, when team affiliation information of all the session members in the corresponding communication session is inconsistent, the filterable label may be displayed in a predefined warning manner to give notice to the user at the local end to avoid involving internal privacy information of the team to which the user at the local end belongs and avoid leakage of the privacy information, conducive to improve the information security. For example, the warning manner may include configuring a predefined warning color for the corresponding filterable label, such as yellow or red. Of course, other presentation attributes may also be configured to highlight the filterable label corresponding to the above communication session of which "team affiliation information of all the session members is inconsistent", which is not limited in the present disclosure.

In step 204, when any filterable label is triggered, communication session associated with the filterable label is filtered from the communication sessions corresponding to the displayed session page entries.

In step 206, the session page entries corresponding to the filtered communication sessions are presented to the user at the local end.

In this example embodiment, the client of the mobile enterprise office platform may present the session page entries corresponding to the filtered communication sessions to the user at the local end in many manners. This process may involve page switching or redirection, and may also occur in the same page, which is not limited in the present disclosure. Assuming that in step 202, the session page entries are displayed in the first session list page, then, in the first situation, the session page entries corresponding to the filtered communication sessions may be displayed in a second session list page (independent of the first session list page); in another situation, a page entry to the second session list page may be displayed in the first session list page, so that the user at the local end may enter the corresponding second session list page through the page entry any time without triggering the corresponding filterable label each time.

Thus, the "session list page" in the present disclosure may be understood as a page for presenting session page entries corresponding to several communication sessions collectively, wherein the session page entries may be arranged in the page in the form of a list (or others). In other words, all pages in line with the above description may be understood as the "session list page" in the present disclosure, which does not specifically refer to a certain page on the client of the mobile enterprise office platform. In fact, the client in the conventional techniques generally may provide a session list page by default, that is, the session list page 11 as shown in FIG. 1, and another session list page may also be provided in the present disclosure.

It should be noted that the terms "first" and "second" for describing the session list pages are only used to distinguish different pages. For example, assuming that a session list page A applicable to step 202 and a session list page B applicable to step 208 exist, the session list page A may refer to the above first session list page and the session list page B may refer to the above second session list page. Moreover, the communication sessions may also be filtered based on the technical solution of the present disclosure according to the session page entry displayed on the session list page B, and therefore, the session list page B may also serve as the "first session list page" applicable to step 202, and a session list page C applicable to step 208 may be further obtained. The session list page C serves as the "second session list page" matching the session list page B to display the session page entry corresponding to the communication session filtered by the user at the local end from the session list page B.

In this example embodiment, the client of the mobile enterprise office platform may determine a trigger manner for any filterable label, and filter a manner of presenting session page entries corresponding to all the filtered communication sessions accordingly. For example, when any filterable label is triggered based on a first preset manner, a second session list page is displayed to the user at the local end; when the same filterable label is triggered based on a second preset manner, a page entry to the second session list page is displayed in the first session list page, and so on, which is not limited in the present disclosure.

In this example embodiment, the client of the mobile enterprise office platform may display a label editing page corresponding to any communication session according to an editing operation of the user at the local end for the communication session. Recommended labels for the communication session are displayed in the label editing page. Then, according to a detected filter operation for any recommended label, the filtered recommended label is associated to the communication session. The recommended labels include at least one of the following:

1) The recommended labels include existing labels that have not been associated to the communication session, so that the user at the local end rapidly associates the communication session to an existing filterable label (that is, an existing label). In particular, when the number of the filterable labels used is large, it is useful to give notice to the user at the local end by displaying the existing labels. The existing labels include a filterable label created by the user at the local end, filterable labels created by other users of the mobile enterprise office platform, or filterable labels included in the mobile enterprise office platform itself, and so on, which is not limited in the present disclosure.

2) The recommended labels include a preset number of common labels obtained based on statistics, so that the user at the local end may conveniently and rapidly filter and set filterable labels, and the user at the local end may be given notice. The common labels may be obtained by statistics based on the usage of filterable labels by the user at the local end, or obtained by statistics based on the usage of filterable labels by all the users of the mobile enterprise office platform, or obtained by statistics in other manners, which is not limited in the present disclosure.

3) The recommended labels include labels that are related to values of particular parameters of the communication session and have not been associated to the communication session. That is, the mobile enterprise office platform may learn a mapping relationship between values of particular parameters of each communication session and filterable labels according to associations between the filterable labels and the communication sessions as well as the values of the particular parameters of the communication session, so that there is high probability that the user at the local end filters the displayed filterable label, thus improving the recommending effect of filterable labels.

Figure 3:
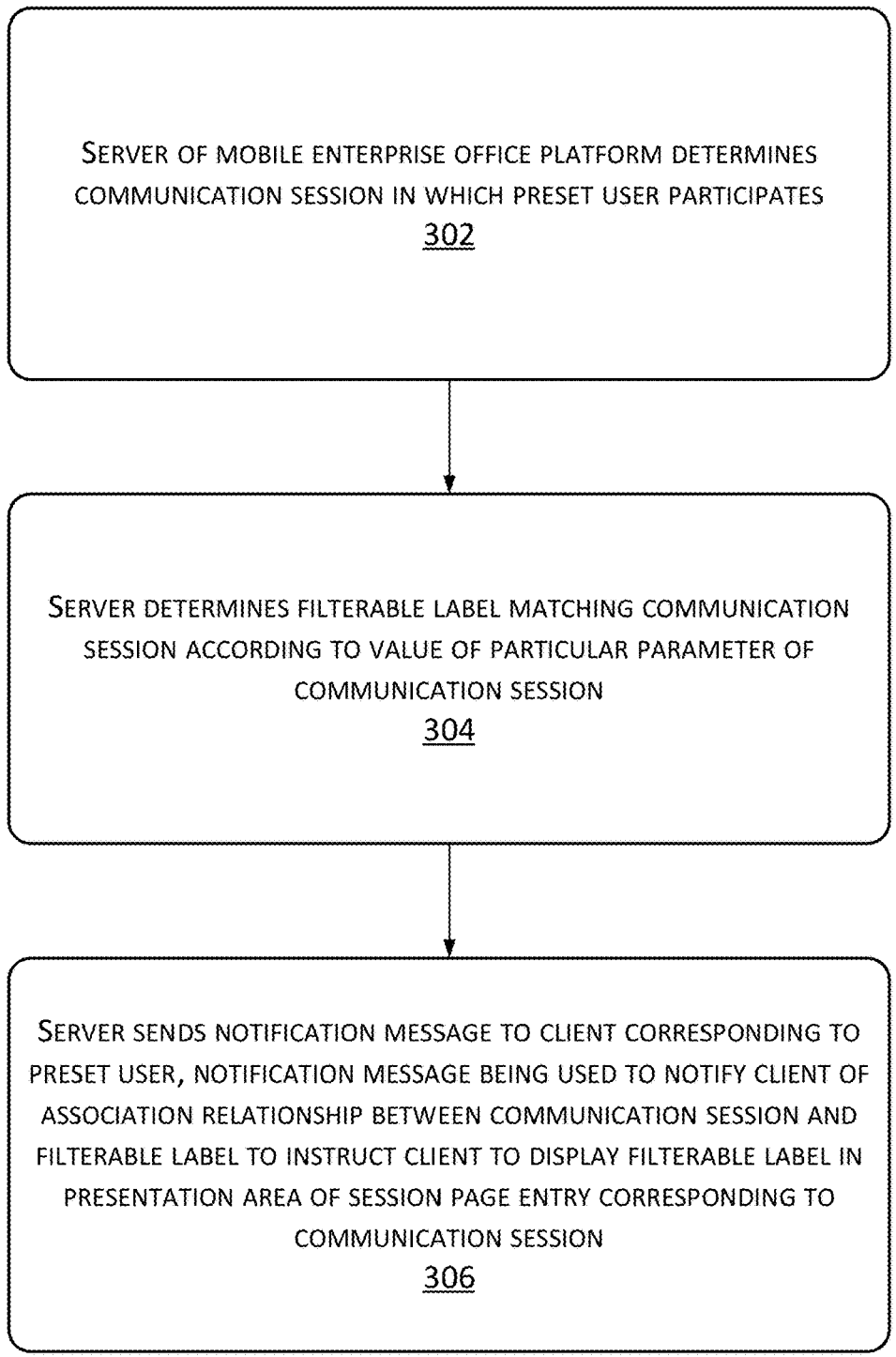
FIG. 3 is a flowchart of a session filtering method based on a server according to an example embodiment of the present disclosure.

Correspondingly, FIG. 3 is a flowchart of a session filtering method based on a server according to an example embodiment of the present disclosure. As shown in FIG. 3, the method may include the following steps.

In step 302, a server of a mobile enterprise office platform determines a communication session in which a preset user participates.

In step 304, the server determines a filterable label matching the communication session according to a value of a particular parameter of the communication session.

In this example embodiment, the particular parameter may include at least one of the following: the communication session being a personal communication session or a group communication session; a degree of affinity between the preset user and a user at a peer end when the corresponding communication session is the personal communication session; consistency between team affiliation information of the preset user and the user at the peer end when the corresponding communication session is the personal communication session; team affiliation information of the user at the peer end when the corresponding communication session is the personal communication session; type information of a corresponding group when the corresponding communication session is the group communication session, wherein the type information is related to consistency between team affiliation information of group members; and team affiliation information of the group members when the corresponding communication session is the group communication session. Of course, the particular parameter is not limited in the present disclosure.

In this example embodiment, the server may acquire a predefined mapping relationship between the value of the particular parameter and the filterable label; then, the server determines a filterable label matching the communication session according to the predefined mapping relationship. The predefined mapping relationship may be obtained by the server by learning associations between other communication sessions and filterable labels, wherein values of the particular parameter for the other communication sessions are the same as or similar to that of the communication session. In other words, the server may obtain a predefined mapping relationship between the value of the particular parameter of the communication session and the filterable label by learning the communication session and the filterable label between which an association has been established, thus accurately determining a filterable label matching the communication session accordingly.

In step 306, the server sends a notification message to a client corresponding to the preset user, the notification message being used to notify the client of an association relationship between the communication session and the filterable label to instruct the client to display the filterable label in a presentation area of a session page entry corresponding to the communication session.

In this example embodiment, the filterable label is used to instruct the client to: when the filterable label is triggered, filter communication session associated with the filterable label and to present the session page entry corresponding to the filtered communication session to the preset user.

As may be seen from the above technical solution, in the present disclosure, filterable labels are displayed in presentation areas of session page entries corresponding to communication sessions, so that a user only needs to record a filterable label associated with a communication session that the user hopes to find, trigger any filterable label displayed, and may perform a filtering operation based on the filterable label for the communication session. Therefore, the user may conveniently and quickly find the desired communication session and start a communication operation without flipping and checking in all communication sessions, which is conducive to improve the communication efficiency.

Figure 4:
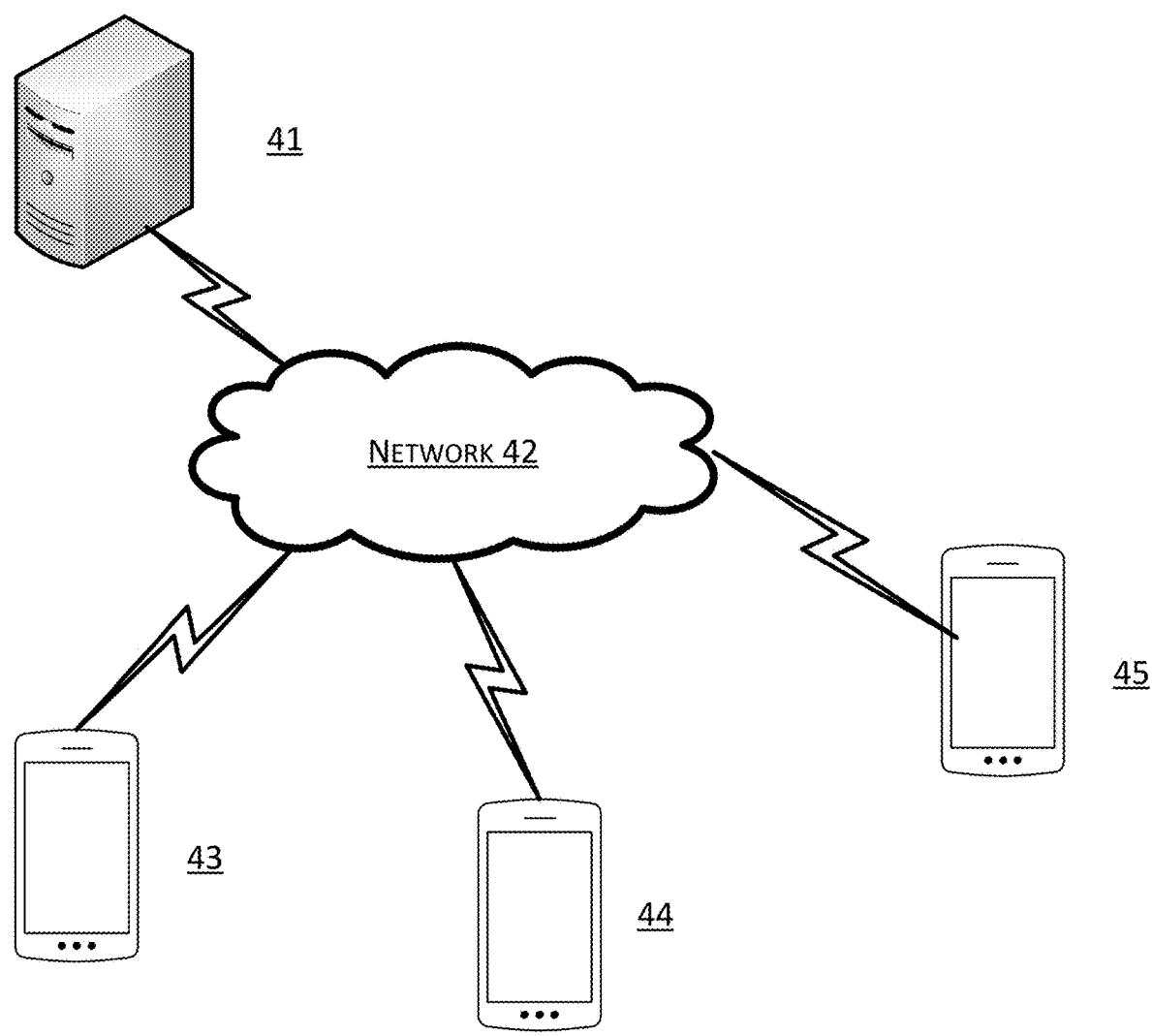
FIG. 4 is a schematic architectural diagram of a session filtering system according to an example embodiment of the present disclosure.

FIG. 4 is a schematic architectural diagram of a session filtering system according to an example embodiment of the present disclosure. As shown in FIG. 4, the system may include a server 41, a network 42, and several electronic devices, for example, a mobile phone 43, a mobile phone 44, a mobile phone 45, and so on.

The server 41 may be a physical server including a separate host, or the server 41 may be a virtual server hosted by a host cluster, or the server 41 may be a cloud server. In the running process, the server 41 may run a program at a server side of a certain application to implement related service functions of the application. For example, when the server 41 runs a program of a mobile team office platform, the server may be implemented as a server of the mobile team office platform. Moreover, in the technical solution of the present disclosure, the server 41 may cooperate with a client of the mobile team office platform running on the mobiles phones 43 to 45 to implement a solution of filtering communication sessions.

The mobiles phones 43 to 45 are only one type of electronic devices that the user may use. In fact, apparently, the user may also use the following types of electronic devices: tablet devices, notebook computers, Personal Digital Assistants (PDAs), wearable devices (such as smart glasses and smart watches), and so on, which is not limited in the present disclosure. In the running process, the electronic device may run a program at a client side of a certain application to implement related service functions of the application. For example, when the electronic device runs a program of a mobile team office platform, the electronic device may be implemented as a client of the mobile team office platform.

The network 42 over which the mobiles phones 43 to 45 and the server 41 interact with each other may include various types of wired or wireless networks. In an example embodiment, the network 42 may include a Public Switched Telephone Network (PSTN) and the Internet. At the same time, the mobiles phones 43 to 45 and other electronic devices may also conduct communication interaction over the network 42. For example, a personal communication session is established between any two electronic devices; alternatively, several electronic devices may participate in the same group communication session so that any user may send a communication message to all other users in the group communication session through his/her own electronic device. For example, when the group communication session is a cross-team communication session among a plurality of teams, team members in the teams may conduct group chat communication through the cross-team communication session. In the technical solution of the present disclosure, it is hoped that the personal communication session, the group communication session, and the like may be quickly filtered by setting filterable labels, thus shortening the search time for the communication session and improving the communication efficiency.

It should be noted that the session filtering solution of the present disclosure may be implemented in the client of the mobile enterprise office platform running on the mobile phones 43 to 45 separately without participation of the server of the mobile enterprise office platform running on the server 41. Alternatively, the session filtering solution of the present disclosure may also be implemented based on the communication interaction process between the server running on the server 41 and the clients running on the mobile phones 43 to 45. Detailed descriptions will be provided for different situations in the following.

For ease of understanding, the technical solution of the present disclosure is described by taking an EIM application as an example. Assuming that an EIM application client is running on the mobile phone 45 and an EIM application server is running on the server 41. A registered account of the user at the local end is logged in to the EIM application client on the mobile phone 45, so that the mobile phone 45 may implement the session filtering solution based on the present disclosure.

Figure 5:
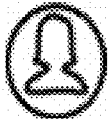
FIG. 5 is a schematic diagram of a session list page according to a first example embodiment of the present disclosure.

FIG. 5 is a schematic diagram of a session list page according to an example embodiment of the present disclosure. As shown in FIG. 5, supposing that a corresponding session list page 50 may be displayed when the EIM application client is running on the mobile phone 45. Session page entries corresponding to the communication sessions in which the user at the local end participates are sequentially arranged and presented on the session list page 50. For example, for a personal communication session between the user at the local end and a user "Xiaobai" at a peer end, a corresponding session page entry 501 is presented on the session list page 50; for a group communication session corresponding to the group "hard-working group" in which the user at the local end participates, a corresponding session page entry 502 is presented on the session list page 50; for a personal communication session between the user at the local end and the user "Xiaobei" at a peer end, a corresponding session page entry 503 is presented on the session list page 50; for a group communication session corresponding to the group "project X" in which the user at the local end participates, a corresponding session page entry 504 is presented on the session list page 50; for a group communication session corresponding to a group "cooperative development" in which the user at the local end participates, a corresponding session page entry 505 is presented on the session list page 50; for a group communication session corresponding to a group "AA&BB" in which the user at the local end participates, a corresponding session page entry 506 is presented on the session list page 50; and similarly, session page entries corresponding to other communication sessions may also be included on the session list page 50, which are not described in detail here.

For the session page entries 501 to 506 displayed on the session list page 50, the EIM application client displays filterable labels based on the technical solution of the present disclosure in presentation areas of the session page entries 501 to 506 respectively. For example, a filterable label displayed in the presentation area of the session page entry 501 is a "colleague" label 511, a filterable label displayed in the presentation area of the session page entry 502 is an "all staff" label 512, a filterable label displayed in the presentation area of the session page entry 503 is an "external" label 513, a filterable label displayed in the presentation area of the session page entry 504 is an "internal" label 514, and filterable labels displayed in the presentation areas of the session page entries 505 to 506 are "cooperation" labels 515 to 516. The filterable label is used to indicate classification of the corresponding communication session and participants of the communication session in a particular type dimension.

For example, when the particular type dimension includes "a personal communication session or a group communication session", the session page entries 501 and 503 displayed in the session list page 50 correspond to a "personal communication session" type, and the filterable labels correspondingly displayed respectively include the "colleague" label 511, the "external" label 513 and so on. Moreover, the session page entries 502, 504, 505 and 506 displayed in the session list page 50 correspond to a "group communication session" type, and the filterable labels correspondingly displayed respectively include the "all staff" label 512, the "internal" label 514, the "cooperation" labels 515 to 516, and so on.

Further, for the session page entries 501 and 503 of the "personal communication session" type, the above particular type dimension may also include "consistency between team affiliation information of the user at the local end and a user at a peer end". Then, when team affiliation information between the user at the local end and a corresponding peer-end user "Xiaobai" is consistent, that is, the user at the local end and the user "Xiaobai" at the peer end belong to the same team, the filterable label displayed in the presentation area of the session page entry 501 may include the "colleague" label 511 and so on, indicating that the user at the local end and the corresponding peer-end user "Xiaobai" are in a colleague relationship. When the team affiliation information between the user at the local end and a corresponding peer-end user "Xiaobei" is inconsistent, that is, the user at the local end and the user "Xiaobei" at the peer end do not belong to the same team, the filterable label displayed in the presentation area of the session page entry 503 may include the "external" label 513 and so on, indicating that the user "Xiaobei" at the peer end is an "external contact" of the user at the local end, so as to be distinguished from the "colleague" inside the team to which the user at the local end belongs.

For the session page entries 502, 504, 505 and 506 of the "group communication session" type, the above particular type dimension may also include "consistency between team affiliation information of group members". Then, when team affiliation information of all group members in the groups "hard-working group" and "project X" is consistent, that is, all the group members are from the same team, the filterable labels displayed in the presentation areas of the session page entries 502 and 504 may include the "all staff" label 512, the "internal" label 514 and so on. When team affiliation information of all group members in the groups "cooperative development" and "AA&BB" is inconsistent, that is, all the group members are from at least two different teams, the filterable labels displayed in the presentation areas of the session page entries 505 and 506 may include the "cooperation" labels 515 to 516 and so on. Further, the above particular type dimension may further include "a relationship between the number of group members and the number of team members". When the number of group members in the group "hard-working group" is consistent with the number of team members in the corresponding team, the filterable label displayed in the presentation area of the session page entry 502 may include the "all staff" label 512, indicating that the group "hard-working group" is a "all-staff group" of the corresponding team. When the number of group members in the group "project X" is less than the number of team members in the corresponding team, the filterable label displayed in the presentation area of the session page entry 504 may include the "internal" label 514, indicating that the group "project X" is an "internal group" of the corresponding team.

The session filtering solution based on the present disclosure may be implemented based on each displayed filterable label in the session list page 50 shown in FIG. 5. Description is given below by taking the "cooperation" labels 515 to 516 as an example. As shown in FIG. 5, supposing that when the user at the local end views the session list page 50 on the electronic device, the electronic device may only present at most five session page entries, for example, session page entries 501 to 505, in the session list page 50 at the same time due to the limited screen size of the electronic device. Then, when the user at the local end needs to view the session page entry 506 corresponding to the group "AA&BB", in the conventional techniques, the user at the local end needs to flip and view the session list page 50. If there is a long distance between the session page entry 506 and the session page entry 505, the user needs to flip the session list page 50 repeatedly and may probably miss the session page entry 506 in the flipping process, and thus the user needs to repeatedly flip the session list page 50 for many times.

Figure 6:
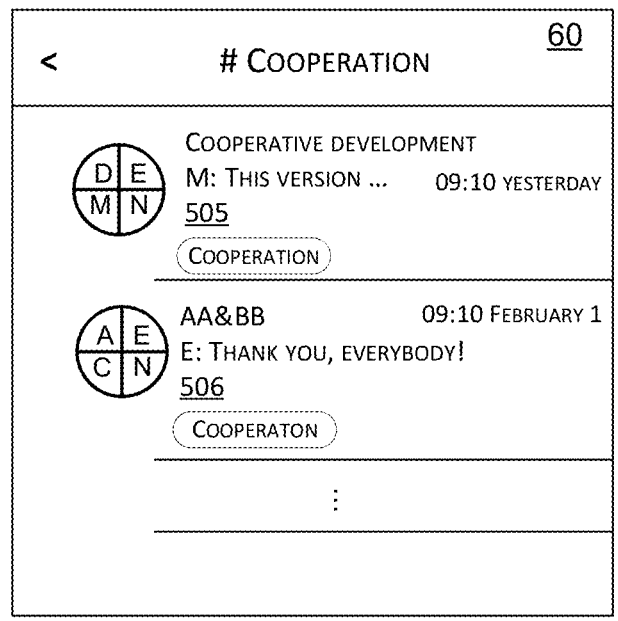
FIG. 6 is a schematic diagram of a session list page after filtering corresponding to FIG. 5.
Figure 7:
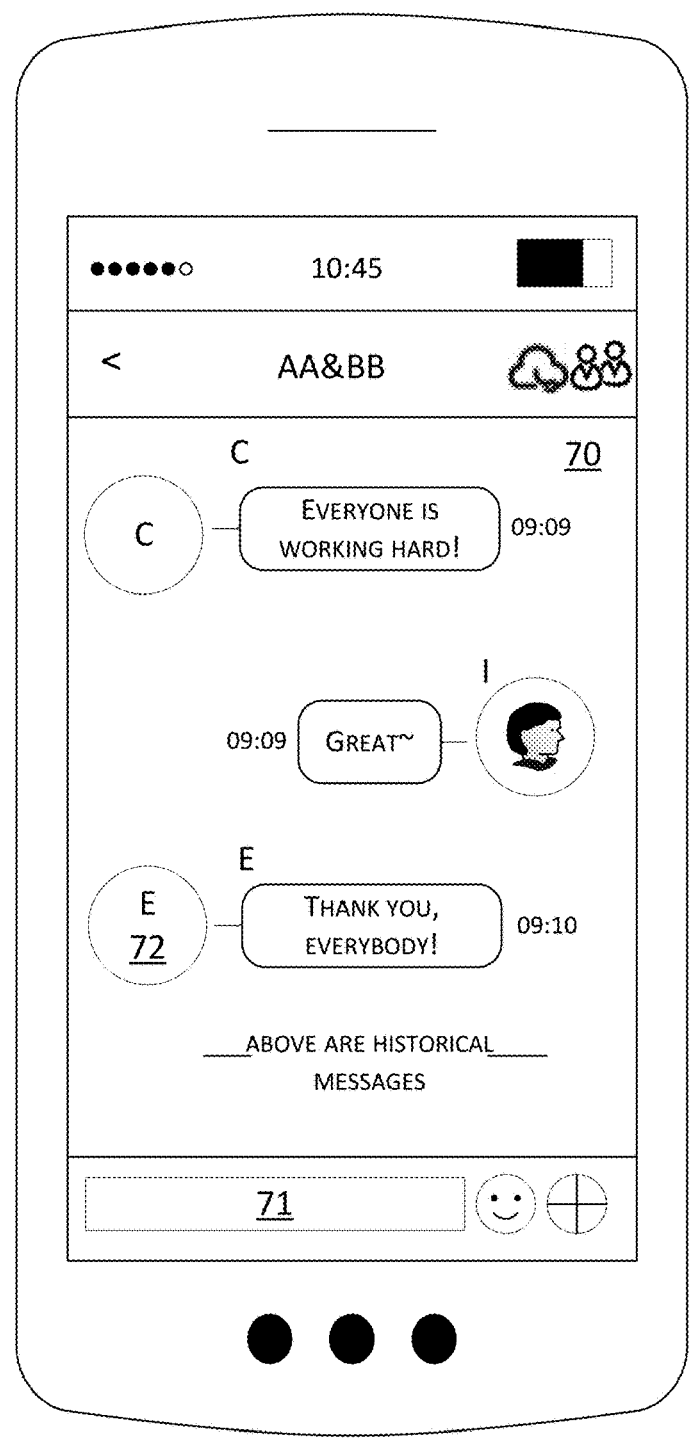
FIG. 7 is a schematic diagram of a communication session page according to an example embodiment of the present disclosure.

However, in this example embodiment, the user at the local end only needs to determine a filterable label associated with a communication session corresponding to the group "AA&BB", for example, the "cooperation" label 516 shown in FIG. 5, and then the user at the local end only needs to find any session page entry containing the "cooperation" label and may filter all communication sessions associated with the "cooperation" label. For example, supposing that the user at the local end finds the session page entry 505 and triggers the "cooperation" label 515 displayed in the presentation area of the session page entry 505, the EIM application client may filter all communication sessions associated with the "cooperation" label and present session page entries corresponding to all the filtered communication sessions to the user at the local end. For example, the session page entries 505 and 506 and so on associated with the "cooperation" label may be sequentially displayed in the session list page 60 shown in FIG. 6, which greatly narrows the search range for the user at the local end and ensures that the user at the local end may quickly find the desired session page entry 506 and enter a communication session page 70 corresponding to the group "AA&BB" as shown in FIG. 7 by triggering the session page entry 506. The user at the local end may input and send a communication message through an input box 71 in the communication session page 70, or the user at the local end may also filter any group member (e.g., click an avatar 72 of a group member E) to quickly enter a communication session page of a personal communication session corresponding to the group member, or complete other operations or functions related to the communication session page 70.

Figure 8:
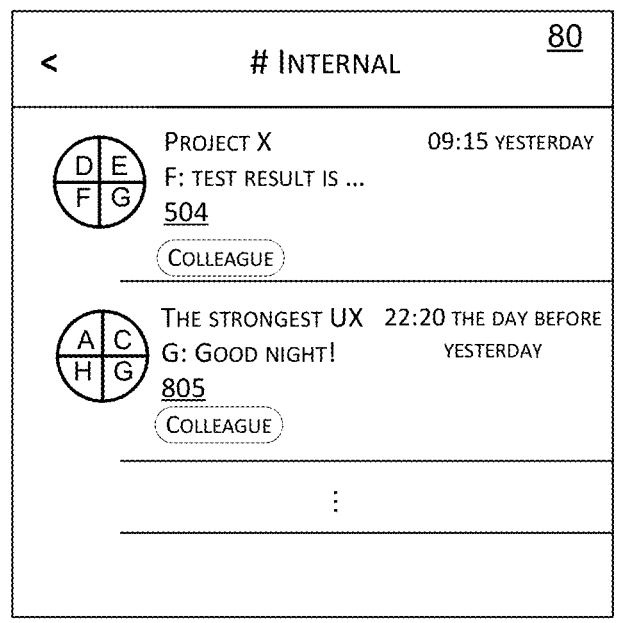
FIG. 8 is a schematic diagram of another session list page after filtering corresponding to FIG. 5.

Similar to the above "cooperation" label 515, the user at the local end may also trigger another filterable label to quickly filter communication sessions associated therewith, and corresponding session page entries are presented to the user at the local end collectively. For example, by taking the "internal" label 514 shown in FIG. 5 as an example, when it is detected that the user at the local end triggers the "internal" label 514 on the session list page 50 shown in FIG. 5, the EIM application client may filter all communication sessions in the session list page 50 that are associated with the "internal" label and display a session list page 80 as shown in FIG. 8. The session list page 80 includes session page entries corresponding to all filtered communication sessions, for example, the session page entry 504 corresponding to the group communication session "project X", a session page entry 805 corresponding to a group communication session "the strongest UX" and so on, so that the user at the local end may further search for a session page entry he/she wants in the session list page 80.

In the above session list page 50 as shown in FIG. 5, each session page entry only includes a single filterable label. It should be appreciated by those skilled in the art that the same communication session may have corresponding values in multiple type dimensions at the same time, so that the same communication session may have a plurality of associated filterable labels. Therefore, the user at the local end conveniently triggers the filterable labels in a plurality of dimensions and filters the corresponding communication sessions based on the triggered filterable labels. Description is made through an example in the following with reference to FIG. 9.

Figure 9:
FIG. 9 is a schematic diagram of a session list page according to a second example embodiment of the present disclosure.

By taking a session list page 90 shown in FIG. 9 as an example, in addition to the dimensions considered in the example embodiment shown in FIG. 5, the dimension of "team affiliation information" may be further added for consideration. For example, team affiliation information of a user at a peer end may be taken into consideration for a personal communication session, thus generating a filterable label associated with the team affiliation information. For example, for a personal communication session between the user at the local end and a user "Xiaobai" at a peer end, supposing that the user "Xiaobai" at the peer end belongs to an enterprise A, an "enterprise A" label 911 (and a "colleague" label) may be displayed in the presentation area of a corresponding session page entry 901. For another example, for a personal communication session between the user at the local end and a user "Xiaobei" at a peer end, supposing that the user "Xiaobei" at the peer end belongs to an enterprise B, an "enterprise B" label 913 (and an "external" label) may be displayed in a presentation area of a corresponding session page entry 903. For another example, for a group communication session, team affiliation information of group members may be taken into consideration, thus generating a filterable label associated with the team affiliation information. For example, for the group "hard-working group", supposing that all the group members belong to an enterprise A, an "enterprise A" label 912 (and an "all staff" label) may be displayed in a presentation area of a corresponding session page entry 902. For another example, for the group "project X", supposing that all the group members belong to an enterprise A and specifically belong to a third group of the enterprise A, an "enterprise A" label 914, a "third group" label 924 (and an "internal" label) may be displayed in a presentation area of a corresponding session page entry 904. For another example, for the group "cooperative development", supposing that all the group members belong to an enterprise A and an enterprise C respectively, an "enterprise A" label 915, an "enterprise C" label 925 (and a "cooperation" label) may be displayed in a presentation area of a corresponding session page entry 905. For another example, for the group "AA&BB", supposing that all the group members belong to an enterprise A and an enterprise D respectively, an "enterprise A" label 916, an "enterprise D" label 926 (and a "cooperation" label) may be displayed in a presentation area of a corresponding session page entry 906.

Figure 10:
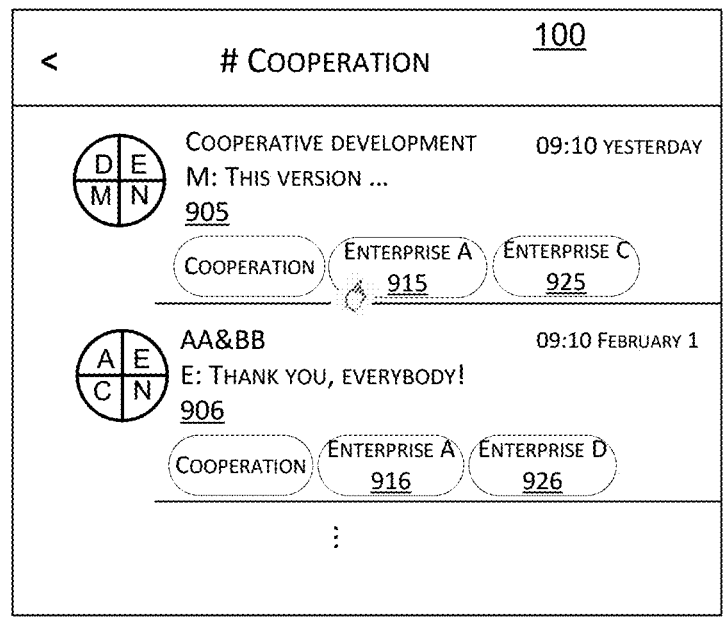
FIG. 10 is a schematic diagram of a session list page after primary filtering corresponding to FIG. 9.

Supposing that the user at the local end hopes to find the session page entry 906 corresponding to the group "AA&BB", the user at the local end only needs to find the session page entry 905 (or any other session page entries where the "cooperation" label is presented) and trigger the "cooperation" label. Then, all communication sessions in the session list page 90 which are related to the "cooperation" label may be filtered and the corresponding session page entries are presented collectively in a session list page 100 as shown in FIG. 10. For example, the session page entry 905 corresponding to the group "cooperative development", the session page entry 906 corresponding to the group "AA&BB" and so on are sequentially displayed on the session list page 100.

Figure 11:
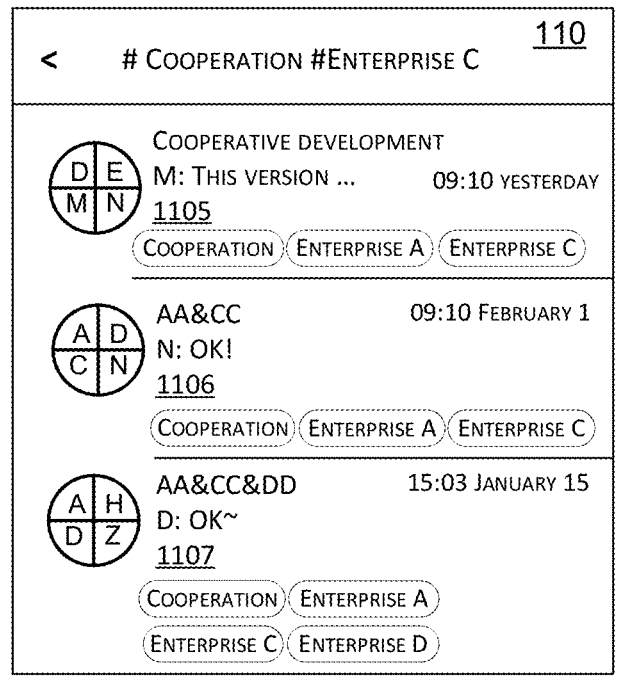
FIG. 11 is a schematic diagram of a session list page after secondary filtering corresponding to FIG. 10.

Further, when the session page entry includes a plurality of filterable labels, the user at the local end may implement multiple times of filtering based on the filterable labels to further narrow the range of the communication session. For example, based on the trigger operation of the user at the local end on the "cooperation" label shown in FIG. 9, the EIM application client displays the session list page 100 shown in FIG. 10; however, if the number of session page entries displayed in the session list page 100 is still large, the user at the local end may further trigger any of the filterable labels in the session list page 100. For example, when it is detected that the user at the local end triggers the "enterprise C" label 925, the EIM application client may further filter all the communication sessions associated with the "enterprise C" in the session list page 100, and display corresponding session page entries in a session list page 110 as shown in FIG. 11. For example, the session list page 110 only includes session page entries 1105, 1106 and 1107 corresponding to a group "cooperative development", a group "AA&CC" and a group "AA&CC&DD". Of course, the user at the local end may also continue filter the communication sessions from the session list page 110. This process is similar to the operating process for the session list page 90 and the session list page 100, which is not described in detail here.

Figure 12:
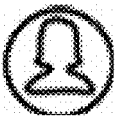
FIG. 12 is a schematic diagram of a session list page according to a third example embodiment of the present disclosure.

FIG. 12 is a schematic diagram of a session list page that distinguishes and presents different filterable labels according to an example embodiment of the present disclosure. As shown in FIG. 12, in a session list page 120 displayed in the EIM application client, corresponding filterable labels are displayed in presentation pages of session page entries 1201 to 1206 respectively. Different filterable labels, for example, a "colleague" label 1211, an "all staff" label 1212, an "external" label 1213, an "internal" label 1214, a "cooperation" label 1215, and so on, may be presented with different predefined presentation attributes. For example, presenting these filterable labels in a distinguishable manner may be implemented through differences of filling manners for the filterable labels in FIG. 12. At the same time, the "cooperation" label 1215 and the "cooperation" label 1216 are both "cooperation" labels and thus adopt the same filling manner to embody that they adopt the same predefined presentation attribute.

Different filterable labels may be correspondingly presented in a distinguishable manner due to different predefined presentation attributes, and thus in the process of flipping and browsing the session list page 120, the user at the local end may implement quick search and positioning for a filterable label he/she wants based on differences in presentation among the different filterable labels without viewing the filterable labels one by one through text content, which is conducive to improve the search efficiency of the user at the local end for the filterable label and further improve the communication efficiency. The above predefined presentation attributes may include any one or more presentation attributes of the filterable labels. For example, the predefined presentation attributes may include a label color, a label shape, a label size, and so on, which is not limited in the present disclosure.

By taking the label color as an example, for the "colleague" label 1211, the "all staff" label 1212, the "internal" label 1214 and other filterable labels in the session list page 120, milder colors may be used because of the consistency between team affiliation information of all session members of communication sessions corresponding thereto. For the "external" label 1213, the "cooperation" label 1215 and other filterable labels, the user at the local end may be at a risk of leaking team internal information in the process of participating in communication sessions due to the inconsistency between team affiliation information of all session members of the communication sessions corresponding to the labels, and thus relatively warning colors may be adopted for the corresponding filterable labels to give notice to the user at the local end, which is conducive to improve the information security in the communication process. Of course, the user at the local end may also be given notice in other manners, which is not limited in the present disclosure.

Figure 13:
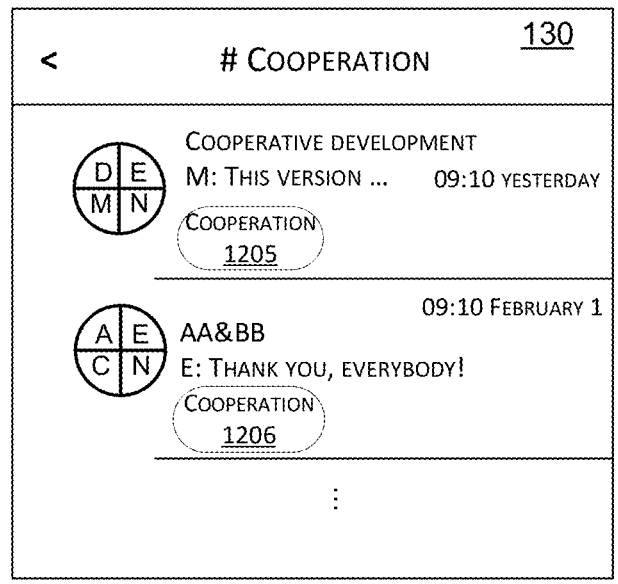
FIG. 13 is a schematic diagram of a session list page after filtering corresponding to FIG. 12.

Further, when it is detected that the user at the local end triggers a filterable label corresponding to any session page entry, supposing that the "cooperation" label 1215 corresponding to the session page entry 1205 in the session list page 120 is triggered, the EIM application client may filter all communication sessions associated with the "cooperation" label in the session list page 120, and display, in a session list page 130 as shown in FIG. 13, the session page entries 1205, 1206 and so on corresponding to all the filtered communication sessions. Since the session list page 130 is obtained by implementing a filtering operation on the session list page 120 based on the "cooperation" label, that is, the session list page 130 is equivalent to a sub-page of the session list page 120 (and related to the triggered filterable label, i.e., the "cooperation" label in the session list page 120), at least a part of the session list page 130 may adopt the same or similar presentation attributes with the "cooperation" label. For example, the same color may be used at the top of the session list page 130 and the "cooperation" label to give notice to the user at the local end about an association between the session list page 130 and the "cooperation" label.

In the above example embodiment, by taking FIG. 12 and FIG. 13 as an example, when a trigger operation of the user at the local end on the "cooperation" label 1215 in the session list page 120 is detected, the EIM application client may directly display the session list page 130, and the session list page 130 includes session page entries corresponding to all the communication sessions associated with the "cooperation" label in the session list page 120. Of course, other presentation manners may also be adopted in the present disclosure, which are described in the following with reference to FIG. 14 and FIG. 15.

Figure 14:
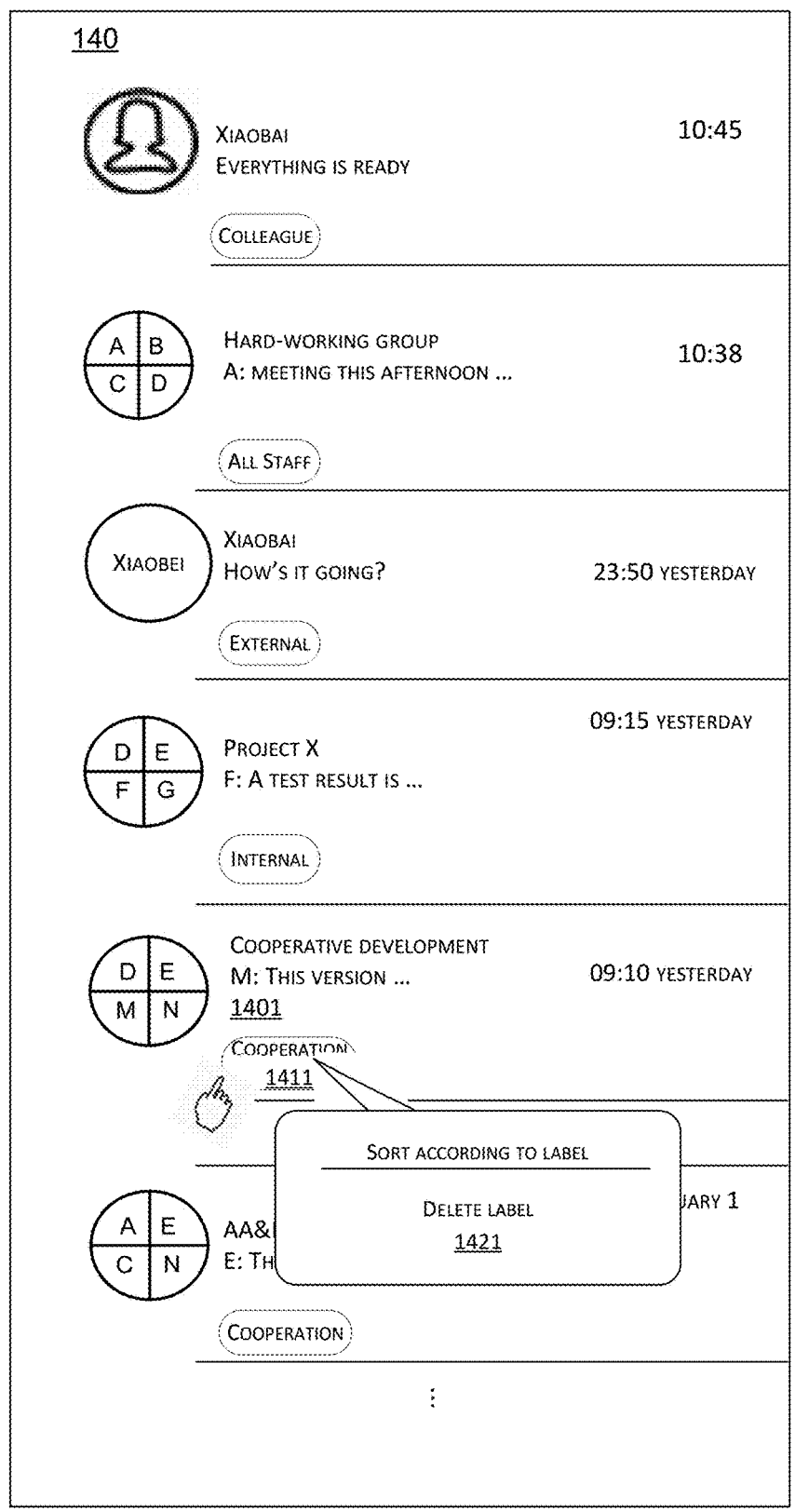
FIG. 14 is a schematic diagram of triggering a filterable label according to an example embodiment of the present disclosure.

As shown in FIG. 14, supposing that it is detected in a session list page 140 that the user at the local end triggers a "cooperation" label 1411 in a session page entry 1401, the EIM application client may display a function menu 1421 which includes "sort according to the label", "delete the label" and other operation function options related to the "cooperation" label 1411. When it is detected that the user at the local end filters the operation function option "sort according to the label", the EIM application client may filter all communication sessions associated with the "cooperation" label 1411 in the session list page 140. However, the EIM application client does not directly display a session list page (similar to the session list page 60 shown in FIG. 6) including session page entries corresponding to the communication sessions, but displays a page entry 1402 for the session list page instead. The page entry 1402 and the above session page entry 1401 and the like are jointly arranged and presented in the session list page 140. When a trigger operation of the user at the local end on the page entry 1402 is detected, the EIM application client may go to the corresponding session list page. Of course, a responding manner may be filtered arbitrarily based on the trigger operation of the user at the local end on the filterable label, which is not limited in the present disclosure. A balanced processing solution is as follows: a corresponding responding manner is adopted for processing for a different triggering manner operated by the user at the local end. For example, when the user at the local end presses the filterable label lightly, the session list page including session page entries corresponding to all the filtered communication sessions is directly displayed, and when the user at the local end presses the filterable label heavily, "sort according to the label" is performed based on the triggered filterable label.

A title 1501, a communication session number 1502 and a preview communication content 1503 may be displayed in the page entry 1402. The title 1501 may be a triggered filterable label. For example, when the "cooperation" label 1411 is triggered, the content of the title 1501 may be "cooperation". The communication session number 1502 may be described in many manners, for example, "label sorting 5" indicates that the number of communication sessions associated with the "cooperation" label is 5. The preview communication content 1503 may be preview contents of recent communication messages in all the filtered communication sessions.

In the technical solution of the present disclosure, the EIM application client may determine filterable labels associated with various communication sessions in many manners, which are illustrated in the following with examples.

Figure 16:
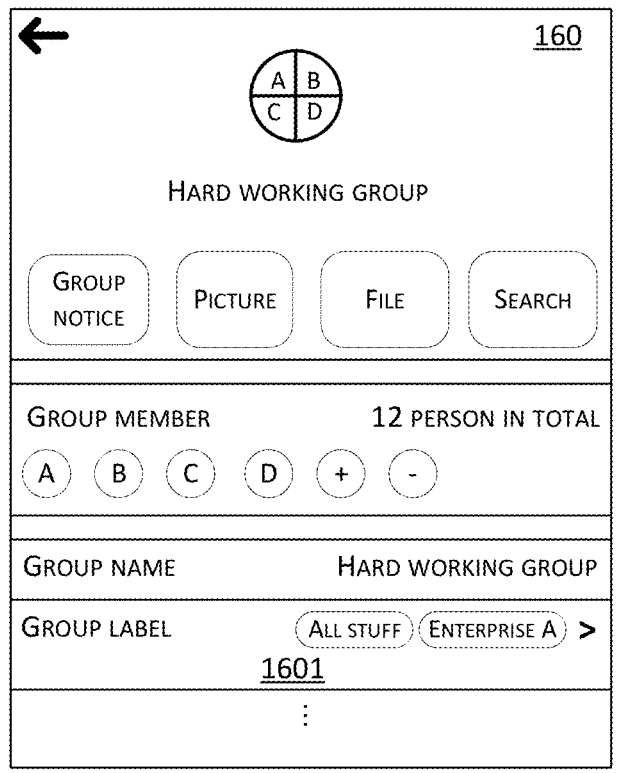
FIG. 16 is a schematic diagram of a group setting page according to an example embodiment of the present disclosure.
Figure 17:
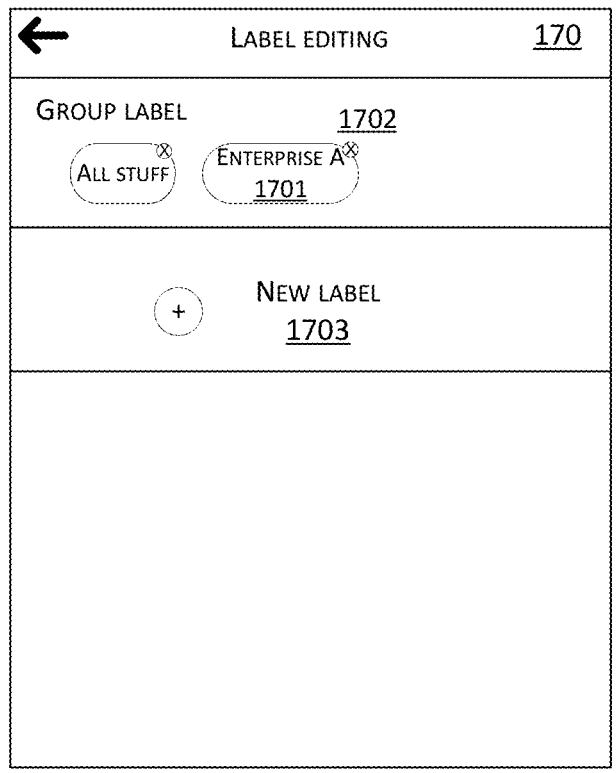
FIG. 17 is a schematic diagram of a label editing page according to an example embodiment of the present disclosure.

In an example embodiment, the EIM application client may determine a corresponding filterable label according to an editing operation of the user at the local end on a communication session. By taking the group "hard-working group" as an example, the user at the local end may start a group setting page 160 as shown in FIG. 16 on the EIM application client. A "group label" entry 1601 may be provided in the group setting page 160, so that the user at the local end may see filterable labels "all staff", "enterprise A" and so on that have been associated with the group "hard-working group". Besides, through the entry 1601, the user at the local end may go to a label editing page 170 shown in FIG. 17, and manually edit the filterable labels associated with the group "hard-working group" through the label editing page 170.

A "current label" area may be included on the label editing page 170 to present the filterable labels that have been associated with the group "hard-working group", such as "all staff" and "enterprise A". By taking an "enterprise A" 1701 as an example, the user at the local end may delete the "enterprise A" 1701 by triggering a 0 mark 1702 in the upper right corner (or another position) of the "enterprise A" label 1701, that is, remove the association between the "enterprise A" label 1701 and the group "hard-working group". A "new label" option 1703 may be included on the label editing page 170. When a trigger operation of the user at the local end on the "new label" option 1703 is detected, a label creating page 180 shown in FIG. 18 may be entered, and a new filterable label is bound to the group "hard-working group".

Figure 18:
FIG. 18 is a schematic diagram of a label creating page according to an example embodiment of the present disclosure.

As shown in FIG. 18, the user at the local end may write a name of a label to be added through an input box 1801; and the user at the local end may set a color used by the new label by filtering an optional color displayed in a color setting area 1802. Of course, the user at the local end may also set other presentation attributes for the new label, and only "color" is taken as an example here.

Several recommended labels, for example, existing labels in an existing label area 1803, common labels in a common label area 1804, and so on, may also be presented to the user at the local end in the label creating page 180. The "existing labels" are filterable labels that have been created, and the filterable labels may be created by the user at the local end in advance, or created by other users of EIM application in advance, which is not limited in the present disclosure. For example, the EIM application client may only display the filterable labels created by the user at the local end, and may exclude the filterable labels that have been associated to the group "hard-working group" to avoid repeated filtering. The "common labels" are obtained by the EIM application client or EIM application server based on statistics. Statistical data may be relevant only to the user at the local end, that is, the "common labels" are used to embody use preferences of the user at the local end for the filterable labels. Alternatively, the statistical data may also be relevant to other uses of EIM application, that is, the "common labels" are used to embody use preferences of more users for the filterable labels. The EIM application client may only display a preset number of "common labels", for example, filterable labels whose use frequencies are "top three". Recommending filterable labels created by other users to the user at the local end may reduce the difficulty in creating filterable labels by the user at the local end and reduce the learning cost of the user at the local end for creating filterable labels.

In addition, the EIM application may learn an association between "a value of a particular parameter of a communication session" and "a filterable label", and determine a filterable label matching any communication session based on a learning result (for example, a mapping relationship between the value of the particular parameter and the filterable label) when the user at the local end edits filterable labels associated with the communication session. The filterable label is presented in an intelligent recommendation area 1805 as shown in FIG. 18 in the form of a "recommended label". When learning samples come from the user at the local end, the above learning process may take place at the EIM application client used by the user at the local end. When the learning samples come from at least a part of users of EIM application (which may include the user at the local end or not include the user at the local end), the above learning process may take place at the EIM application server.

The particular parameter referenced in the learning process may include at least one of the following:

(1) the communication session being a personal communication session or a group communication session;

(2) a degree of affinity between the user at the local end and a user at a peer end when the corresponding communication session is the personal communication session;

(3) consistency between team affiliation information of the user at the local end and the user at the peer end when the corresponding communication session is the personal communication session;

(4) team affiliation information of the user at the peer end when the corresponding communication session is the personal communication session;

(5) type information of a corresponding group when the corresponding communication session is the group communication session, wherein the type information is related to consistency between team affiliation information of group members; and (6) team affiliation information of the group members when the corresponding communication session is the group communication session.

Of course, other parameters of the communication session and values of the parameters may also be applied to the above learning process, which is not limited in the present disclosure.

Figure 19:
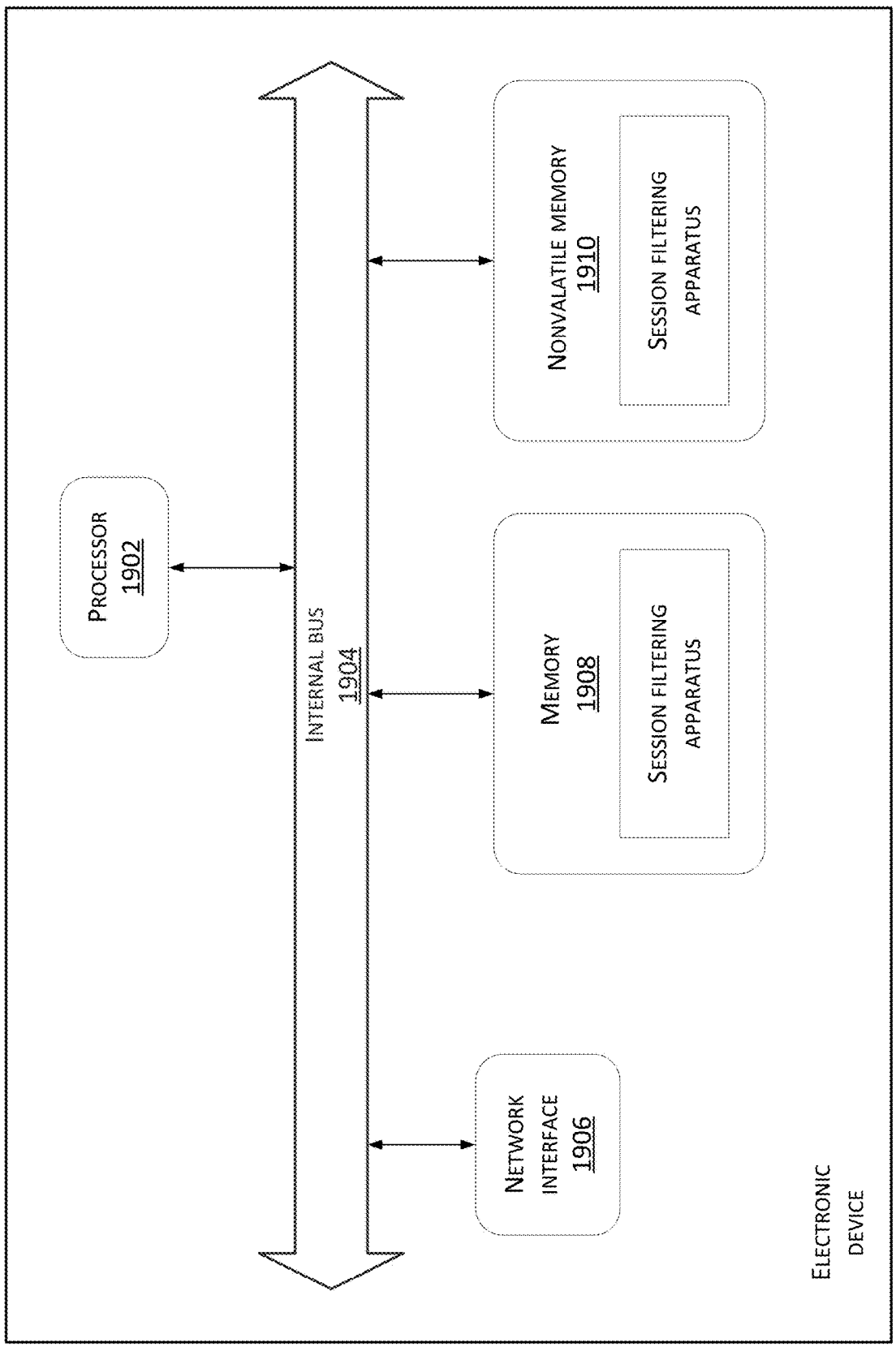
FIG. 19 is a schematic structural diagram of an electronic device based on a client according to an example embodiment of the present disclosure.

FIG. 19 is a schematic structural diagram of an electronic device based on a client according to an example embodiment of the present disclosure. Referring to FIG. 19, at the hardware level, the electronic device includes a processor 1902, an internal bus 1904, a network interface 1906, a memory 1908, and a non-volatile memory 1910, and of course may further include hardware required by other services. The processor 1902 reads a corresponding computer program from the non-volatile memory 1910 to the memory 1908 for running, which forms a session filtering device at the logical level. Of course, in addition to the software implementation, the present disclosure does not exclude other implementations, such as logic devices or a combination of software and hardware, etc. In other words, the following processing procedure may not be performed only by various logic units, but also may be performed by hardware or logic devices.

Figure 20:
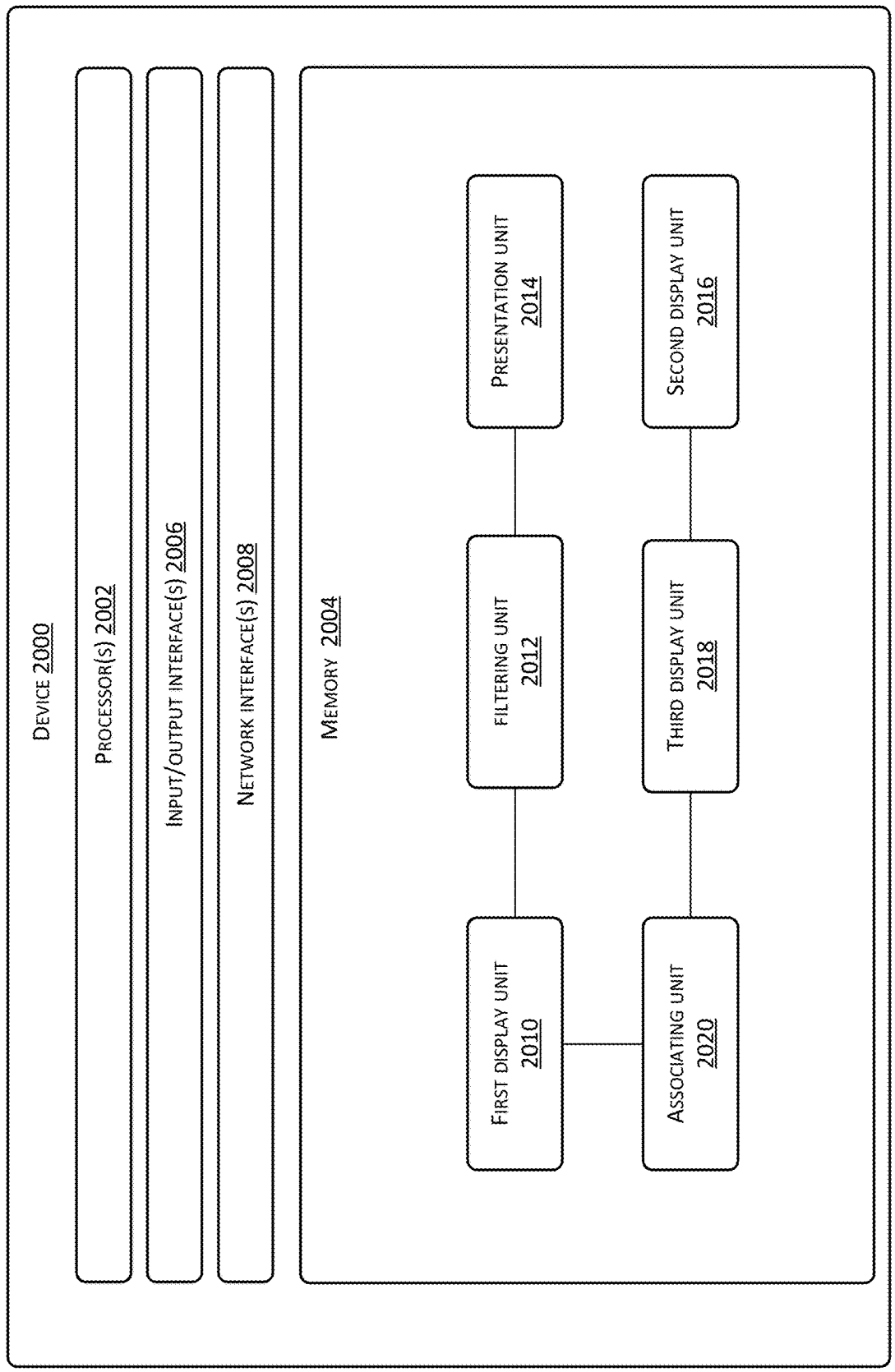
FIG. 20 is a block diagram of a session filtering device based on a client according to an example embodiment of the present disclosure.

Referring to FIG. 20, a session filtering device 2000 includes one or more processor(s) 2002 or data processing circuit unit(s) and memory 2004. The device 2000 may further include one or more input/output interface(s) 2006 and one or more network interface(s) 2008. The memory 2004 is an example of computer readable medium or media.

The memory 2004 may store therein a plurality of modules or units including a first display unit 2010, a filtering unit 2012, and a presentation unit 2014.

The first display unit 2010 is configured to display session page entries corresponding to at least a part of communication sessions in which a user at the local end participates via a preset communication application, presentation areas of the session page entries containing filterable labels associated with the corresponding communication sessions.

The filtering unit 2012 is configured to, when any filterable label is triggered, filter communication session associated with the filterable label from the communication sessions corresponding to the displayed session page entries.

The presentation unit 2014 configured to present the session page entries corresponding to the filtered communication sessions to the user at the local end.

For example, content of the filterable labels is associated with at least one of the following information:

consistency between team affiliation information of the user at the local end and a user at a peer end when the corresponding communication session is a personal communication session;

team affiliation information of the user at the peer end when the corresponding communication session is a personal communication session;

type information of a corresponding group when the corresponding communication session is a group communication session, wherein the type information is related to consistency between team affiliation information of group members; and team affiliation information of the group members when the corresponding communication session is a group communication session.

For example, when the filterable labels are presented in the presentation areas of the session page entries, the filterable labels are presented in a distinguishable manner based on corresponding predefined presentation attributes.

For example, the predefined presentation attributes include: a label color.

For example, when the filterable labels are presented in the presentation areas of the session page entries, the filterable labels are presented based on a predefined warning manner if team affiliation information of session members in the corresponding communication session is inconsistency.

For example, the first display unit 2010 is specifically configured to display in a first session list page in the preset communication application, the session page entries corresponding to at least a part of communication sessions in which the user at the local end participates; and the presentation unit 2004 is specifically configured to present the session page entries corresponding to the filtered communication sessions in a second session list page; or present a page entry to the second session list page in the first session list page.

For example, the presentation unit 2014 is specifically configured to:

determine a trigger manner for the filterable label;

present the second session list page to the user at the local end when the filterable label is triggered based on a first preset manner; and present the page entry to the second session list page in the first session list page when the filterable label is triggered based on a second preset manner.

For example, the device 2000 may further include the following modules or units in the memory 2004:

a second display unit 2016 configured to display, according to an editing operation of the user at the local end for any communication session, a label editing page corresponding to the communication session;

a third display unit 2018 configured to display recommended labels for the communication session in the label editing page; and an associating unit 2020 configured to associate the filtered recommended label to the communication session according to a detected filter operation for any recommended label.

For example, the recommended labels include at least one of the following:

existing labels that have not been associated to the communication session, a preset number of common labels obtained based on statistics, and labels that are related to values of particular parameters of the communication session and have not been associated to the communication session.

Figure 21:
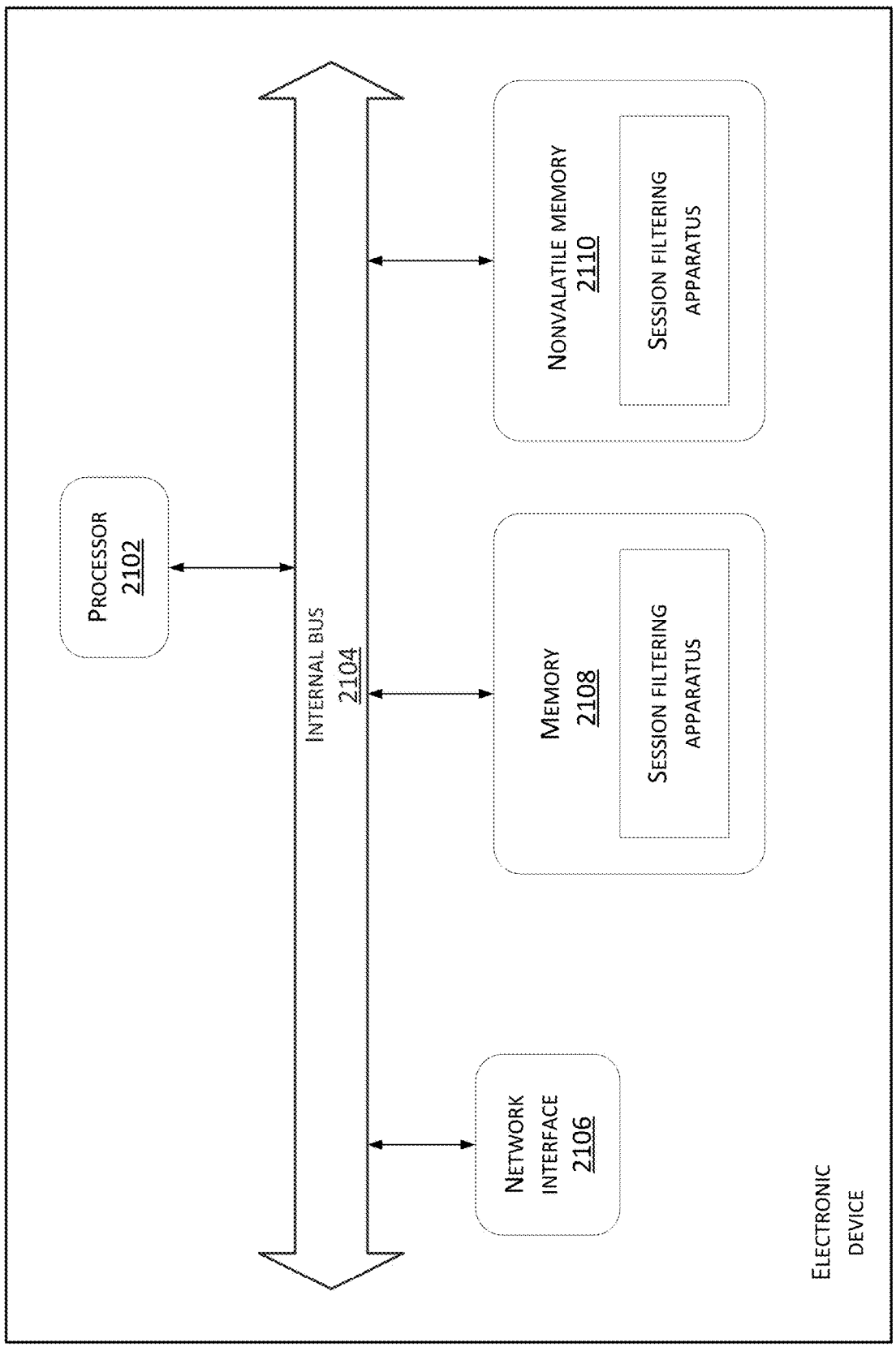
FIG. 21 is a schematic structural diagram of an electronic device based on a server according to an example embodiment of the present disclosure.

FIG. 21 is a schematic structural diagram of an electronic device based on a server according to an example embodiment of the present disclosure. Referring to FIG. 21, at the hardware level, the electronic device includes a processor 2102, an internal bus 2104, a network interface 2106, a memory 2108, and a non-volatile memory 2110, and of course may further include hardware required by other services. The processor 2102 reads a corresponding computer program from the non-volatile memory 2110 to the memory 2108 for running, which forms a session filtering device at the logical level. Of course, in addition to the software implementation, the present disclosure does not exclude other implementations, such as logic devices or a combination of software and hardware, etc. In other words, the following processing procedure may not be performed only by various logic units, but also may be performed by hardware or logic devices.

Figure 22:
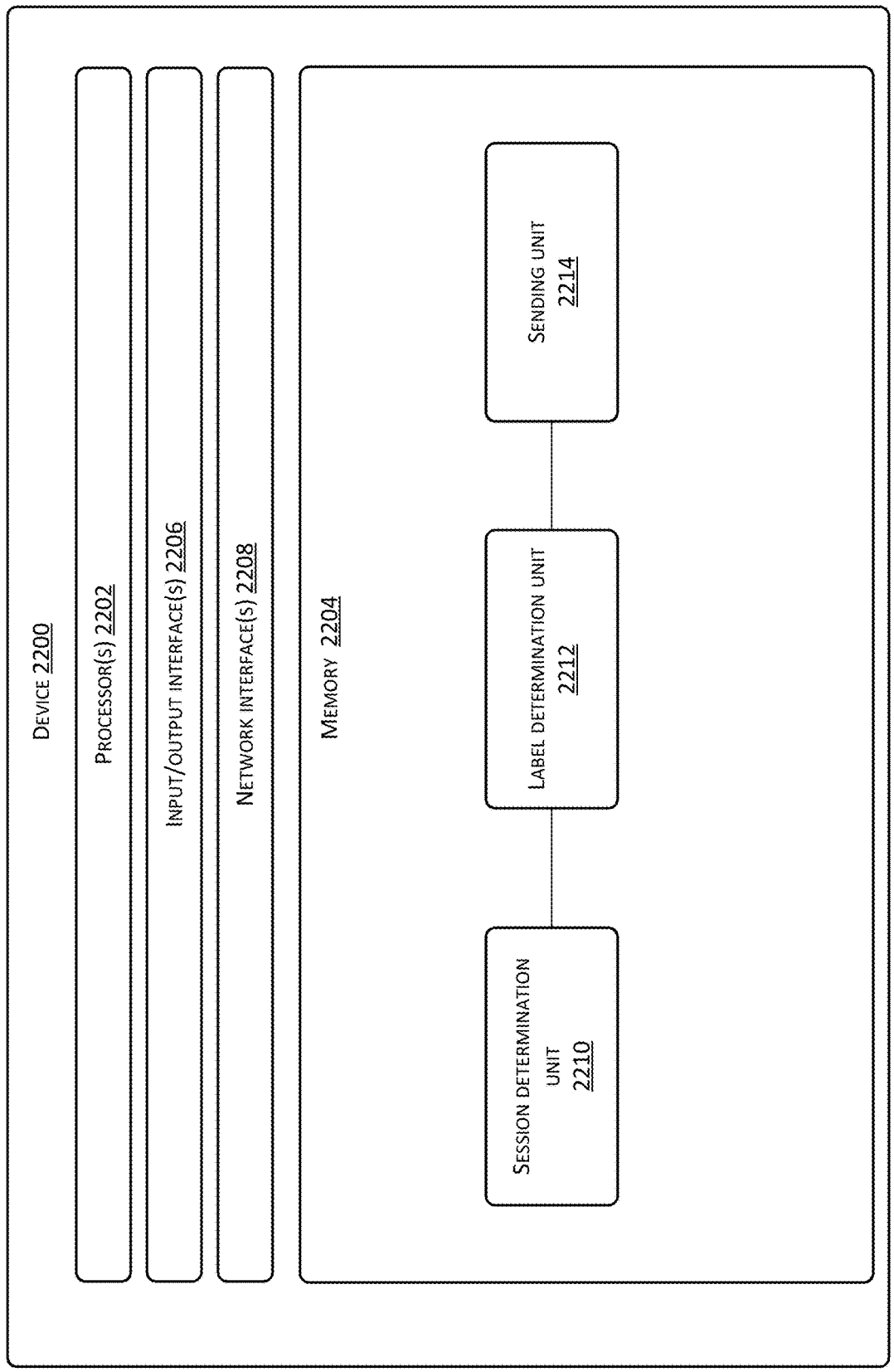
FIG. 22 is a block diagram of a session filtering device based on a server according to an example embodiment of the present disclosure.

Referring to FIG. 22, a session filtering device 2200 includes one or more processor(s) 2202 or data processing circuit unit(s) and memory 2204. The device 2200 may further include one or more input/output interface(s) 2206 and one or more network interface(s) 2208. The memory 2204 is an example of computer readable medium or media.

The memory 2204 may store therein a plurality of modules or units including a session determination unit 2210, a label determination unit 2212, and a sending unit 2214.

The session determination unit 2210 is configured to determine, by a server of a preset communication application, a communication session in which a preset user participates.

The label determination unit 2212 is configured to determine, by the server, a filterable label matching the communication session according to a value of a particular parameter of the communication session.

The sending unit 2214 is configured to send, by the server, a notification message to a client corresponding to the preset user, the notification message being used to notify the client of an association relationship between the communication session and the filterable label to instruct the client to display the filterable label in a presentation area of a session page entry corresponding to the communication session, wherein the filterable label is used to instruct the client to: when the filterable label is triggered, filter communication session associated with the filterable label to present the session page entry corresponding to the filtered communication session to the preset user.

For example, the particular parameter includes at least one of the following:

the communication session being a personal communication session or a group communication session;

a degree of affinity between the preset user and a user at a peer end when the corresponding communication session is the personal communication session;

consistency between team affiliation information of the preset user and the user at the peer end when the corresponding communication session is the personal communication session;

team affiliation information of the user at the peer end when the corresponding communication session is the personal communication session;

type information of a corresponding group when the corresponding communication session is the group communication session, wherein the type information is related to consistency between team affiliation information of group members; and team affiliation information of the group members when the corresponding communication session is the group communication session.

For example, the label determination unit 2212 is specifically configured to:

acquire, by the server, a predefined mapping relationship between the value of the particular parameter and the filterable label; and determine, by the server, a filterable label matching the communication session according to the predefined mapping relationship.

For example, the predefined mapping relationship is obtained by the server by learning associations between other communication sessions and filterable labels, wherein values of the particular parameter for the other communication sessions are the same as or similar to that of the communication session.

The system, device, module or unit illustrated in the above example embodiments may be implemented by a computer chip or an entity, or by a product having a certain function. A typical implementation device is a computer. For example, the computer may be specifically in the form of a personal computer, a laptop computer, a cellular phone, a camera phone, a smart phone, a personal digital assistant, a media player, a navigation device, an email device, a game console, a tablet computer, a wearable device, or a combination of any of these devices.

In a typical configuration, the computer includes one or more central processing units (CPUs), an input/output interface, a network interface, and a memory.

The memory may include computer readable media such as a volatile memory, a Random-Access Memory (RAM), and/or non-volatile memory, e.g., a Read-Only Memory (ROM) or a flash RAM. The memory is an example of a computer readable medium.

The computer readable medium includes non-volatile and volatile media as well as movable and non-movable media, and may implement information storage by means of any method or technology. The information may be a computer readable instruction, a data structure, and a module of a program or other data. An example of the storage medium of a computer includes, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition in this text, the computer readable medium does not include transitory media, such as a modulated data signal and a carrier.

It should be further noted that the terms "include", "comprise" or other variations thereof are intended to cover non-exclusive inclusion, so that a process, a method, a commodity or a device including a series of elements not only includes the elements, but also includes other elements not clearly listed, or further includes elements inherent to the process, the method, the commodity or the device. In the absence of more limitations, an element defined by "including a/an . . . " does not exclude that the process, the method, the commodity or the device including the element further has other identical elements.

Example embodiments will be described in detail herein, and examples thereof are shown in the accompanying drawings. In the following description involving the accompanying drawings, the same numerals in different accompanying drawings denote the same or similar elements, unless specified otherwise. Implementations described in the following example embodiments do not represent all implementations consistent with the present disclosure. In contrast, they are merely examples of devices and methods consistent with some aspects of the present disclosure as described in detail in the appended claims.

Terms used in the present disclosure are merely used for describing specific example embodiments, instead of limiting the present disclosure. Singular forms "a(n)", "said", and "the" used in the present disclosure and the appended claims also include plural forms, unless clearly specified in the context that other meanings are denoted. It should be further understood that the term "and/or" used herein refers to and includes any or all possible combinations of one or more associated items listed.

It should be understood that, although terms such as "first", "second", and "third" may be used to describe various kinds of information in the present disclosure, these kinds of information should not be limited to the terms. These terms are merely used to distinguish information of the same type from each other. For example, without departing from the scope of the present disclosure, the first information may also be referred to as second information, and similarly, the second information may also be referred to as first information. Depending on the context, the word "if" used herein may be explained as "when . . . ", "as . . . ", or "in response to the determination".

The above description is merely example embodiments of the present disclosure, and is not used to limit the present disclosure. Any modification, equivalent replacement, improvement and the like made without departing from the spirit and principle of the present disclosure should be included in the protection scope of the present disclosure.

The present disclosure may further be understood with clauses as follows.

Clause 1. A session filtering method comprising:
displaying session page entries corresponding to at least a part of communication sessions in which a user at a local end participates via a preset communication application, presentation areas of the session page entries containing filterable labels associated with corresponding communication sessions;
when a filterable label is triggered, filtering one or more communication sessions associated with the filterable label from communication sessions corresponding to the displayed session page entries; and
presenting one or more session page entries corresponding to the filtered communication sessions to the user at the local end.

Clause 2. The method of clause 1, wherein content of the filterable labels is associated with at least one of the following information:
consistency between team affiliation information of the user at the local end and a user at a peer end when a corresponding communication session is a personal communication session;
team affiliation information of the user at the peer end when the corresponding communication session is a personal communication session;
type information of a corresponding group when a corresponding communication session is a group communication session, wherein the type information is related to consistency of team affiliation information of group members; and
team affiliation information of the group members when the corresponding communication session is the group communication session.

Clause 3. The method of clause 1, wherein when filterable labels are presented in the presentation areas of the session page entries, the filterable labels are presented in a distinguishable manner based on corresponding predefined presentation attributes.

Clause 4. The method of clause 3, wherein the predefined presentation attributes comprise a label color.

Clause 5. The method of clause 1, wherein when the filterable labels are presented in the presentation areas of the session page entries, the filterable labels are presented based on a predefined warning manner if team affiliation information of session members in the corresponding communication session is inconsistent.

Clause 6. The method of clause 1, wherein
the displaying the session page entries corresponding to at least the part of communication sessions in which the user at the local end participates via the preset communication application comprises: displaying, in a first session list page, the session page entries corresponding to at least the part of communication sessions in which the user at the local end participates via the preset communication application; and
the presenting the session page entries corresponding to the filtered communication sessions to the user at the local end comprises: presenting the session page entries corresponding to the filtered communication sessions in a second session list page; or presenting a page entry to the second session list page in the first session list page.

Clause 7. The method of clause 6, wherein the presenting the session page entries corresponding to the filtered communication sessions to the user at the local end comprises:
determining a trigger manner for the filterable label; and
presenting the second session list page to the user at the local end when the filterable label is triggered based on a first preset manner; or
presenting the page entry to the second session list page in the first session list page when the filterable label is triggered based on a second preset manner.

Clause 8. The method of clause 1, further comprising:
displaying, according to an editing operation of the user at the local end for a communication session, a label editing page corresponding to the communication session;
displaying a recommended label for the communication session in the label editing page; and
associating, according to a detected filter operation for the recommended label, a filtered recommended label with the communication session.

Clause 9. The method of clause 8, wherein the recommended labels comprise at least one of the following:
an existing label that has not been associated to the communication session;
a preset number of common labels obtained based on statistics; and
a label that is related to a value of a parameter of the communication session and has not been associated to the communication session.

Clause 10. A session filtering method comprising:
determining, by a server of a preset communication application, a communication session in which a preset user participates;
determining, by the server, a filterable label matching the communication session according to a value of a parameter of the communication session; and
sending, by the server, a notification message to a client corresponding to the preset user, the notification message notifying the client of an association relationship between the communication session and the filterable label to instruct the client to display the filterable label in a presentation area of a session page entry corresponding to the communication session,
wherein the filterable label is used to instruct the client to, when the filterable label is triggered, filter communication session associated with the filterable label to present the session page entry corresponding to the filtered communication session to the preset user.

Clause 11. The method of clause 10, wherein the parameter comprises at least one of the following:

the communication session is a personal communication session or a group communication session;

a degree of affinity between the preset user and a user at a peer end when the corresponding communication session is the personal communication session;

consistency between team affiliation information of the preset user and the user at the peer end when the corresponding communication session is the personal communication session;

team affiliation information of the user at the peer end when the corresponding communication session is the personal communication session;

type information of a corresponding group when the corresponding communication session is the group communication session, wherein the type information is related to consistency of team affiliation information of group members; and team affiliation information of the group members when the corresponding communication session is the group communication session.

Clause 12. The method of clause 10, wherein the determining, by the server, the filterable label matching the communication session according to the value of the parameter of the communication session comprises:

acquiring, by the server, a predefined mapping relationship between values of parameters and filterable labels; and determining, by the server, the filterable label matching the communication session according to the predefined mapping relationship.

Clause 13. The method of clause 12, wherein the predefined mapping relationship is obtained by the server by learning associations between other communication sessions and filterable labels, wherein values of the parameter for the other communication sessions are the same as or similar to the value of the communication session.

Clause 14. A session filtering device comprising:

a first display unit configured to display session page entries corresponding to at least a part of communication sessions in which a user at the local end participates via a preset communication application, presentation areas of the session page entries containing filterable labels associated with the corresponding communication sessions;

a filtering unit configured to, when a filterable label is triggered, filter one or more communication sessions associated with the filterable label from communication sessions corresponding to the displayed session page entries; and a presentation unit configured to present the one or more session page entries corresponding to the filtered communication sessions to the user at the local end.

Clause 15. The device of clause 14, wherein when filterable labels are presented in the presentation areas of the session page entries, the filterable labels are presented in a distinguishable manner based on corresponding predefined presentation attributes.

Clause 16. The device of clause 14, wherein when the filterable label is presented in the presentation areas of the session page entries, the filterable label is presented based on a predefined warning manner if team affiliation information of session members in the corresponding communication session is inconsistent.

Clause 17. The device of clause 14, wherein:

the first display unit is specifically configured to display in a first session list page the session page entries corresponding to at least the part of communication sessions in which the user at the local end participates via the preset communication application; and the presentation unit is specifically configured to present the session page entries corresponding to the filtered communication sessions in a second session list page or present a page entry to the second session list page in the first session list page.

Clause 18. The device of clause 17, wherein the presentation unit is specifically configured to determine a trigger manner for the filterable label;

present the second session list page to the user at the local end when the filterable label is triggered based on a first preset manner; and present the page entry to the second session list page in the first session list page when the filterable label is triggered based on a second preset manner.

Clause 19. The device of clause 14, further comprising:

a second display unit configured to display, according to an editing operation of the user at the local end for the communication session, a label editing page corresponding to the communication session;

a third display unit configured to display a recommended label for the communication session in the label editing page; and an associating unit configured to associate, according to a detected filter operation for the recommended label, the filtered recommended label with the communication session.

Clause 20. A session filtering device comprising:

a session determination unit configured to determine, by a server of a preset communication application, a communication session in which a preset user participates;

a label determination unit configured to determine, by the server, a filterable label matching the communication session according to a value of a parameter of the communication session; and a sending unit configured to send, by the server, a notification message to a client corresponding to the preset user, the notification message notifying the client of an association relationship between the communication session and the filterable label to instruct the client to display the filterable label in a presentation area of a session page entry corresponding to the communication session, wherein the filterable label is used to instruct the client to, when the filterable label is triggered, filter communication session associated with the filterable label to present the session page entry corresponding to the filtered communication session to the preset user.

Clause 21. The device of clause 20, wherein the label determination unit is specifically configured to:

acquire, by the server, a predefined mapping relationship between the value of the parameter and the filterable label; and determine, by the server, the filterable label matching the communication session according to the predefined mapping relationship.

Clause 22. The device of clause 21, wherein the predefined mapping relationship is obtained by the server by learning associations between other communication sessions and filterable labels, wherein values of the parameter for the other communication sessions are the same as or similar to the value of the communication session.

What is claimed is:

1. A method comprising:

displaying session page entries corresponding to multiple communication sessions via a session list page of an instant messaging application, each of the session page entries being displayed with one or more respective filterable labels in the session list page of the instant messaging application;
detecting that a first filterable label that is displayed with one of the session page entries is triggered;
filtering one or more communication sessions associated with the first filterable label from the multiple communication sessions; and
presenting one or more session page entries corresponding to the one or more filtered communication sessions, each of the one or more session page entries being displayed with at least the first filterable label.

2. The method of claim 1, wherein a content of the filterable labels is associated with a consistency between team affiliation information of a user at a local end that participates in the multiple communication sessions and a user at a peer end when a corresponding communication session is a personal communication session.

3. The method of claim 1, wherein a content of the filterable labels is associated with team affiliation information of a user at a peer end when the corresponding communication session is a personal communication session.

4. The method of claim 1, wherein a content of the filterable labels is associated with type information of a corresponding group when a corresponding communication session is a group communication session, wherein the type information is related to consistency of team affiliation information of group members.

5. The method of claim 1, wherein a content of the filterable labels is associated with team affiliation information of the group members when the corresponding communication session is the group communication session.

6. The method of claim 1, further comprising presenting the filterable labels based on corresponding predefined presentation attributes.

7. The method of claim 6, wherein the predefined presentation attributes comprise at least one of a label color, a size, or a shape.

8. The method of claim 1, further comprising presenting the filterable label based on a predefined warning color if team affiliation information of session members in a corresponding communication session is inconsistent.

9. The method of claim 1, wherein the displaying the session page entries corresponding to multiple communication sessions via the instant messaging application comprises:
displaying, in a first session list page, the session page entries corresponding to the multiple sessions in which a user at a local end participates via the instant messaging application.

10. The method of claim 9, wherein the presenting the one or more session page entries corresponding to the one or more filtered communication sessions comprises:
presenting the one or more session page entries in a second session list page.

11. The method of claim 9, wherein the presenting the one or more session page entries corresponding to the one or more filtered communication sessions comprises:
presenting a page entry to a second session list page in the first session list page, the second session listing page including the one or more session page entries.

12. The method of claim 1, further comprising:
displaying, according to an editing operation of a user at a local end for a communication session, a label editing page corresponding to the communication session;
displaying a recommended label for the communication session in the label editing page; and
associating, according to a detected filter operation for the recommended label, a filtered recommended label with the communication session.

13. The method of claim 12, wherein the recommended label comprises at least one of the following:
an existing label that has not been associated to the communication session;
a preset number of common labels obtained based on statistics; and
a label that is related to a value of a parameter of the communication session and has not been associated to the communication session.

14. A device comprising:
one or more processors; and
one or more memories storing computer readable instructions that, executable by the one or more processors, cause the one or more processors to perform acts comprising:
determining a communication session in which a preset user participates an instant messaging application that displays session page entries corresponding to multiple communication sessions are displayed in the instant messaging application, each of the session page entries being displayed with one or more respective filterable labels;
determining a filterable label matching the communication session according to a value of a parameter of the communication session; and
sending a notification message to a client corresponding to the preset user, the notification message notifying the client of an association relationship between the communication session and the filterable label to instruct the client to display the filterable label in a presentation area of a session page entry corresponding to the communication session.

15. The device of claim 14, wherein the filterable label is used to instruct the client to, when the filterable label is triggered, filter communication session associated with the filterable label to present the session page entry corresponding to the filtered communication session to a user of the client.

16. The device of claim 14, wherein the parameter comprises at least one of the following:
the communication session is a personal communication session or a group communication session;
a degree of affinity between the preset user and a user at a peer end when the corresponding communication session is the personal communication session;
consistency between team affiliation information of the preset user and the user at the peer end when the corresponding communication session is the personal communication session;
team affiliation information of the user at the peer end when the corresponding communication session is the personal communication session;
type information of a corresponding group when the corresponding communication session is the group communication session, wherein the type information is related to consistency of team affiliation information of group members; and
team affiliation information of the group members when the corresponding communication session is the group communication session.

17. The device of claim 14, wherein the determining the filterable label matching the communication session according to the value of the parameter of the communication session comprises:

acquiring a predefined mapping relationship between values of parameters and filterable labels; and determining the filterable label matching the communication session according to the predefined mapping relationship.

18. One or more memories storing computer readable instructions that, executable by one or more processors, cause the one or more processors to perform acts comprising:

displaying session page entries corresponding to multiple communication sessions via an instant messaging application, each of the session page entries being displayed with one or more respective filterable labels;

detecting that a filterable label that is displayed with one of the session page entries is triggered;

filtering one or more communication sessions associated with the filterable label from the multiple communication sessions; and presenting one or more session page entries corresponding to the one or more filtered communication sessions.

* * * * *